(12) United States Patent
Labana et al.

(10) Patent No.: US 8,528,059 B1
(45) Date of Patent: Sep. 3, 2013

(54) APPARATUSES, METHODS AND SYSTEMS FOR A SECURE RESOURCE ACCESS AND PLACEMENT PLATFORM

(75) Inventors: Harpreet Singh Labana, Millwood, NY (US); Yair Israel Kronenberg, New York, NY (US); Brian J. Saluzzo, Maplewood, NJ (US)

(73) Assignee: Goldman, Sachs & Co., New York, NY (US)

( * ) Notice: Subject to any disclaimer, the term of this patent is extended or adjusted under 35 U.S.C. 154(b) by 822 days.

(21) Appl. No.: 12/574,673

(22) Filed: Oct. 6, 2009

Related U.S. Application Data

(60) Provisional application No. 61/103,565, filed on Oct. 7, 2008, provisional application No. 61/103,175, filed on Oct. 6, 2008.

(51) Int. Cl.
| | |
|---|---|
| *G06F 17/30* | (2006.01) |
| *G06F 7/04* | (2006.01) |
| *G06F 15/16* | (2006.01) |
| *G06F 12/14* | (2006.01) |
| *G06F 13/00* | (2006.01) |
| *H04L 29/06* | (2006.01) |

(52) U.S. Cl.
USPC ............ 726/5; 705/76; 726/1; 726/4; 726/21; 726/18; 726/19; 726/20

(58) Field of Classification Search
USPC .......................................... 705/76; 726/1, 6
See application file for complete search history.

(56) References Cited

U.S. PATENT DOCUMENTS

| | | | | |
|---|---|---|---|---|
| 6,851,113 | B2 * | 2/2005 | Hemsath ........................ | 718/104 |
| 7,200,869 | B1 * | 4/2007 | Hacherl et al. .................. | 726/27 |
| 8,134,948 | B2 * | 3/2012 | Jeon et al. ...................... | 370/322 |
| 2006/0059117 | A1 * | 3/2006 | Tolson et al. ..................... | 707/2 |
| 2011/0154443 | A1 * | 6/2011 | Thakur et al. ..................... | 726/3 |

* cited by examiner

*Primary Examiner* — Carolyn B Kosowski
(74) *Attorney, Agent, or Firm* — Perkins Coie LLP

(57) ABSTRACT

The APPARATUSES, METHODS AND SYSTEMS FOR A SECURE RESOURCE ACCESS AND PLACEMENT PLATFORM ("SRAP PLATFORM") provides a secure supporting infrastructure within a corporate network framework and applications based thereon for use and placement of corporate resources. A non-trusted device may be authorized to access and use corporate resources, and the corporate network server may manage the placement of resources via the SRAP PLATFORM.

34 Claims, 13 Drawing Sheets

APPARATUSES, METHODS AND SYSTEMS FOR A SECURE RESOURCE ACCESS AND PLACEMENT PLATFORM

RELATED APPLICATIONS

Applicant hereby claims priority under 35 USC §119 for U.S. provisional patent application Ser. No. 61/103,175 filed on Oct. 6, 2008, entitled "APPARATUSES, METHODS AND SYSTEMS FOR EXTENDED SECURITY PLANE INFRASTRUCTURE," and for U.S. provisional patent application Ser. No. 61/103,565 filed on Oct. 7, 2008, entitled "APPARATUSES, METHODS AND SYSTEMS FOR EXTENDED SECURITY PLANE INFRASTRUCTURE".

FIELD

The present invention is directed generally to an apparatuses, methods, and systems of remote access management, and more particularly, to APPARATUSES, METHODS AND SYSTEMS FOR A SECURE RESOURCE ACCESS AND PLACEMENT PLATFORM.

BACKGROUND

Corporate employees may have flexible working environments and thus may demand to access to applications and business data within the corporate network from a non-trusted environment. For example, the corporate employee may want to operate on a personal laptop to access the corporate email system.

SUMMARY

The APPARATUSES, METHODS AND SYSTEMS FOR A SECURE RESOURCE ACCESS AND PLACEMENT PLATFORM (hereinafter "SRAP PLATFORM") provides a secure supporting infrastructure within a corporate network framework and applications based thereon, whereby users may access and use corporate resources from a variety of potentially non-trusted devices, and the corporate network server may manage the placement of resources.

In one embodiment, a multi-layered processor-implemented method for secure access to corporate resources, comprising: receiving a Payload specific request to access a plurality of corporate resources from at least one user; initializing via a processor a uniquely identified Shell based on the received request; receiving a set of user authentication credentials from the user; sending the set of user authentication credentials to a corporate server controlling the corporate resources; receiving an authentication decision from the corporate server; and if the authentication decision is affirmative, establishing a secure connection between the Shell and the corporate server, receiving a plurality of control policies from the corporate server via the secure connection, and accessing the plurality of corporate resources via the established secure connection in compliance with the received control policies.

In one embodiment, a multi-layered processor-implemented method for secure access to corporate resources, comprising: receiving a Payload specific request to access a plurality of corporate resources from at least one non-trusted entity; receiving via a processor a set of user authentication credentials from the non-trusted entity; determining whether the non-trusted entity is authenticated based on the received user authentication credentials; if the non-trusted entity is authenticated, generating a plurality of control policies, establishing a secure connection to the non-trusted entity, sending the generated plurality of control policies to the non-trusted entity via the established secure connection, and granting access to the non-trusted entity to at least one of the plurality of corporate resources via the established secure connection based on the generated plurality of control policies.

In one embodiment, a multi-layered processor-implemented method for secure access to corporate resources, comprising: receiving a Payload specific request to access a plurality of corporate resources; receiving a set of user authentication credentials from at least one non-trusted entity; analyzing via a processor formats of the received set of user authentication credentials from the non-trusted entity; determining a validity of the formats of the received user authentication credentials; and if the formats of the received user authentication credentials are valid, conducting an authentication process based on the received user authentication credentials, establishing a first secure connection with a corporate server controlling the plurality of corporate resources, providing the received request to access the plurality of corporate resources and the received user authentication credentials to the corporate server via the first secure connection, establishing a second secure connection with the non-trusted entity, receiving a plurality of control policies and a plurality of user data from the corporate server via the first secure connection, and providing the plurality of control policies and the plurality of user data to the non-trusted entity via the second secure connection.

BRIEF DESCRIPTION OF THE DRAWINGS

The accompanying appendices and drawings illustrate various non-limiting, example, inventive aspects in accordance with the present disclosure.

Figure 1:
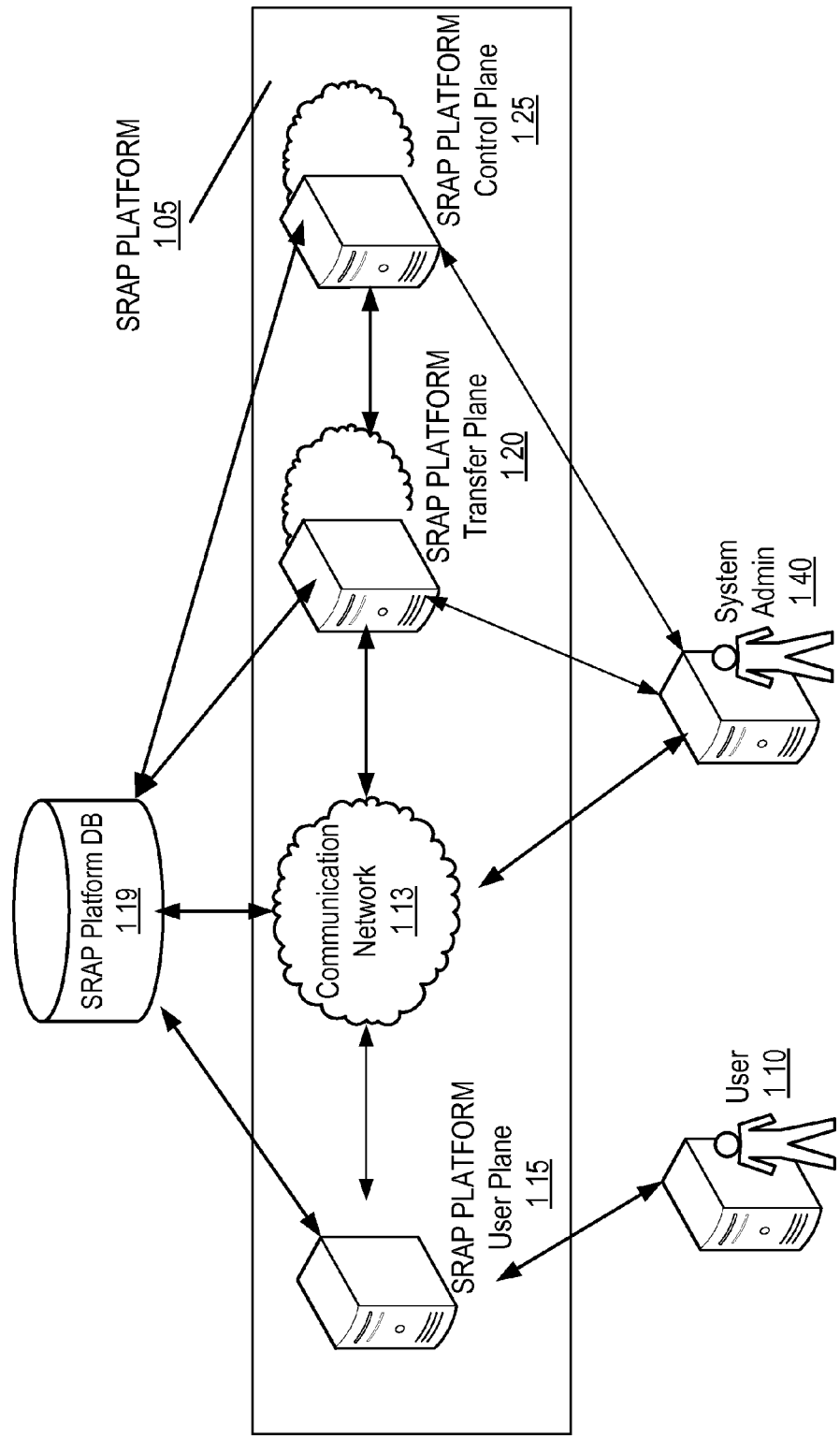
FIG. 1 is of a block diagram illustrating an overview of an implementation of data flows between a secure resource access and placement platform (hereinafter "SRAP PLATFORM") and affiliated entities in one embodiment of the SRAP PLATFORM operation.

APPENDICES 1A-B and 2A-G illustrate specifications in one embodiment of the SRAP PLATFORM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure details the implementation of apparatuses, methods, and systems for a secure resource access and placement platform (hereinafter, "SRAP PLATFORM"). SRAP PLATFORM implements a secure supporting infrastructure within a corporate network framework and applications based thereon whereby users may access and use corporate resources from a variety of potentially non-trusted devices, and the corporate network server may manage the placement of resources.

For example, in one embodiment, an employee of a corporation operating a personal mobile device, such as, but not limited to a laptop, a blackberry and/or the like, may request to access corporate resources (applications and/or data within corporate network) through the SRAP PLATFORM. For example, in one implementation, the employee may request to download a file stored on an internal document system of the corporate network via a corporate document retrieval application (e.g. DocsOpen, etc.), to access corporate email (e.g. through Microsoft Outlook, Thunderbird, etc.), and/or the like. Such applications involving accessing, obtaining, and/or exchanging with the corporate resources may be processed and delivered by encapsulation with user information and user overhead, and are referred to as herein "Payload." For instance, the corporate document retrieval application and the email application, as discussed in the above examples, may be examples of Payloads. In one embodiment, the SRAP PLATFORM may provide secure transmission and management of Payload, Payload contents (e.g. overhead data related to the Payload, etc.), user data (e.g. emails, user requested documents, etc.), and/or the like through a series of secured interfaces.

It is to be understood that, depending on the particular needs and/or characteristics of a SRAP PLATFORM user, administrator, server, data, monetization structure, hardware configuration, network framework, and/or the like, various embodiments of the SRAP PLATFORM may be implemented that enable a great deal of flexibility and customization. The instant disclosure discusses embodiments of the SRAP PLATFORM primarily within the context of secured resource access and placement for a corporate network. However, it is to be understood that the system described herein may be readily configured/customized for a wide range of other applications or implementations. For example, aspects of the SRAP PLATFORM may be adapted for cryptographic communications, remote access management and/or the like. It is to be understood that the SRAP PLATFORM may be further adapted to other implementations for general network management applications and network infrastructure designs.

FIG. 1 is of a block diagram illustrating an overview of an implementation of a SRAP PLATFORM and affiliated entities in one embodiment of the SRAP PLATFORM. In FIG. 1, a user (or users) 110, a SRAP PLATFORM User Plane 115, a SRAP PLATFORM Transfer Plane 120, a SRAP PLATFORM Control Plane 125, a SRAP PLATFORM Database 119 and a system administrator 140 are shown to interact via a communication network 113. The user 110 may operate with the SRAP PLATFORM User Plane using a wide variety of different communications devices and technologies within embodiments of SRAP PLATFORM operation. For example, in one embodiment, the users 110 may operate devices such as, but not limited to, computer terminals, laptops, cellular telephony handsets, blackberries, PDAs, iPhones, softphones, and/or the like.

In one embodiment, the user no may operate with a personal device unauthenticated to access secured networks, e.g. corporate resources on a corporate network. In that case, the user no may access a SRAP PLATFORM 105 via the SRAP PLATFORM User Plane 115. In one embodiment, the SRAP PLATFORM User Plane 115 may be a mechanism residing a trusted corporate logical entity residing in a potential hostile environment (e.g. unauthenticated personal device) providing host embodiment, a SRAP PLATFORM User Plane 115 may include, but not limited to an employee owned laptop, which operates with its own OS and other applications, and also with corporate authenticated software applications.

In one embodiment, the SRAP PLATFORM User Plane 115 may send Payload requests to access corporate resources to the SRAP PLATFORM Transfer Plane via a communication network 113. In one embodiment, the SRAP PLATFORM User Plane 115 may receive Payload contents from the SRAP PLATFORM Transfer Plane 120 via the communication network 113. The communication network 113 may include, but not limited to an in-house Bluetooth connection, a local area network (LAN), a wide area network (WAN), a wireless cellular network, the Internet, and/or the like. In one embodiment, Payloads may be delivered and processed on a plurality of interfaces of the User Plane 115, and the User Plane 115 may receive policies to control interface activities from the Transfer Plane 120.

In one embodiment, the SRAP PLATFORM Transfer Plane 120 may be an intermediate entity that bridges the SRAP PLATFORM User Plane 115 and the SRAP PLATFORM Control Plane 125, and advertises and deploys Payload content and policies generated by the Control Plane 125 to the User Plane 115. For example, in one implementation, a Transfer Plane may include, but not limited to, the corporate demilitarized zone (DMZ), corporate hosted infrastructure for non-user data transfers, and/or the like.

In one embodiment, the SRAP PLATFORM Control Plane 125 may generate Payload content and policies determining interface behaviors. For example, the Control Plane may be, but not limited to a corporate network which originates and manages user data, and/or the like. In one embodiment, the Control Plane 125 may generate user data, such as, but not limited to user login data, user profile data and/or the like. In one embodiment, the SRAP PLATFORM Control Plane 125 may receive Payload requests forwarded from the Transfer Plane 120, and may then generate and deliver Payload contents accordingly.

In one embodiment, the SRAP PLATFORM 105 may also communicate with a SRAP PLATFORM database 119. In some embodiments, distributed SRAP PLATFORM databases may be integrated in-house with the User Plane 115, the Transfer Plane 120, and/or the Control Plane 125, respectively. In other embodiments, the SRAP PLATFORM entities may access a remote SRAP PLATFORM database 119 via the communication network 113. The SRAP PLATFORM 105 may send obtained data to the database 119 for storage, such as, but not limited to user account information, requested Payload, policies for interface activities, hardware information, security protocols, and/or the like.

In one embodiment, a system administrator 140 may communicate with the SRAP PLATFORM User Plane 115, Transfer Plane 120, Control Plane 125 and the SRAP PLATFORM database 119 for regular maintenance, service failure, system updates, database renewal, security surveillance and/or the like. In one embodiment, the system administrator 140 may directly operate with the SRAP PLATFORM 105 and the SRAP PLATFORM database 119 on an in-house basis, such as, but not limited to via an integrated administrator user interface. In another embodiment, the system administrator 140 may remotely access the SRAP PLATFORM 105 and the SRAP PLATFORM database 119 and perform its functionality via the communication network 113. In one embodiment, the system administrator may control the management process at the SRAP PLATFORM Control Plane 125, as will be further illustrated in FIG. 5.

Figure 2:
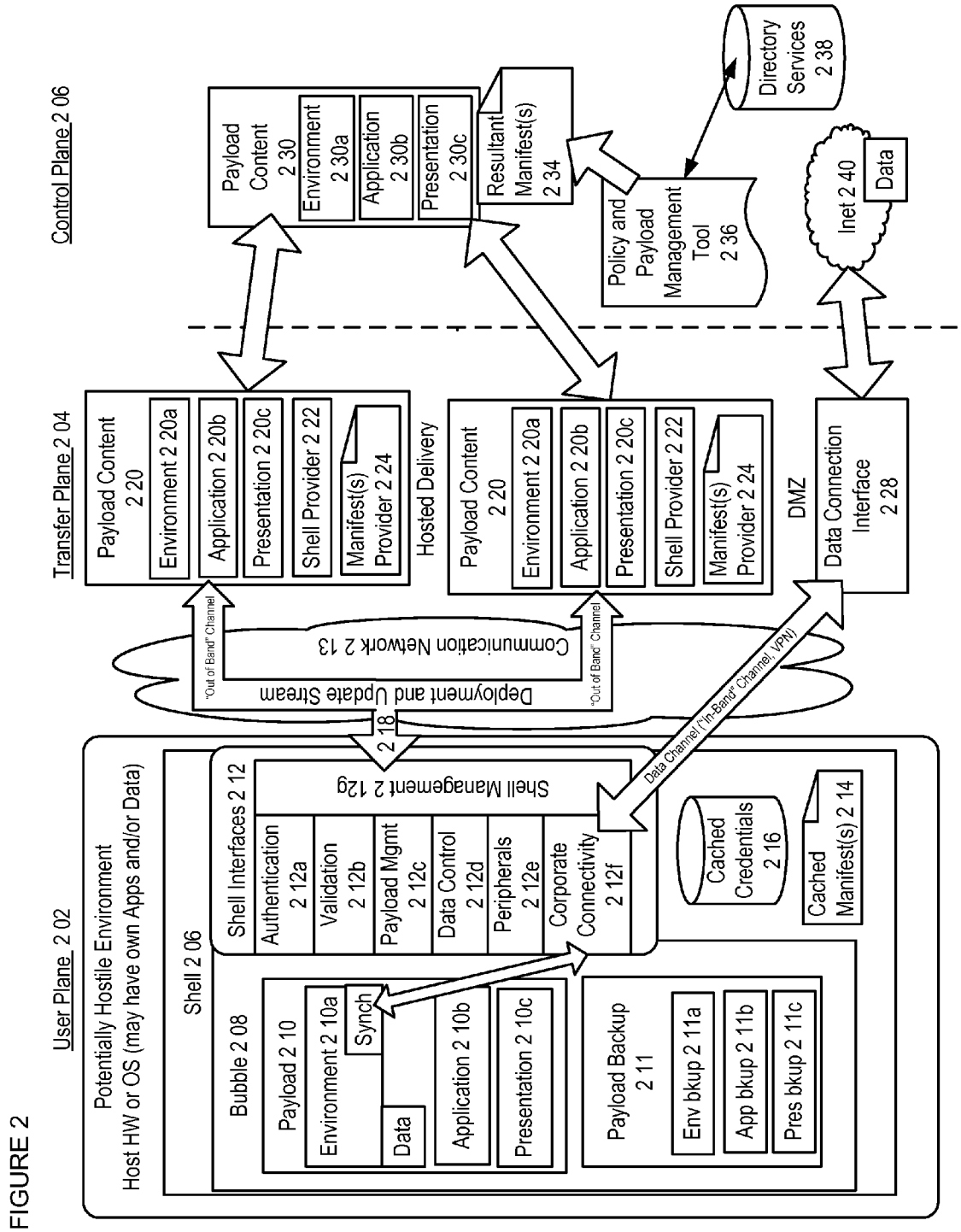
FIG. 2 provides a diagram illustrating aspects of a reference architecture of the SRAP PLATFORM in one embodiment of the SRAP PLATFORM operation.

FIG. 2 provides a diagram illustrating aspects of a reference architecture of the SRAP PLATFORM in one embodiment of the SRAP PLATFORM operation. In one embodiment, the SRAP PLATFORM architecture may comprise three logical parts, a User Plane 202, a Transfer Plane 203 and a Control Plane 204, as discussed in FIG. 1.

In one embodiment, the User Plane 202 may process and deliver a variety of Payloads 210 requesting to access corporate resources on the SRAP PLATFORM. For example, in one implementation, an employee operating a personal laptop may request to access the corporate email through an encrypted email application, e.g. Microsoft Outlook, etc. In one embodiment, there may be at lest three different types of Payloads, the Environment 210a, the Application 210b and the Presentation 210c.

A Payload type of Environment 210a may include, but not limited to interactive access to full corporate sessions (applications and data) both online and offline, and/or the like. For example, in one embodiment, an Environment 210a may include, but not limited to corporate configured hardware, corporate managed hypervisor, corporate managed OS container, and/or the like. In one implementation, an Environment 210a may retain user data 210d (such as, but not limited to user authentication information, user overhead, and/or the like) and synchronize 210 with the SRAP PLATFORM. An Environment 210a may be employed by corporate laptops, corporate blackberries, virtual laptops and/or the like. In one embodiment, an Environment 210a may be constrained from data and applications such as, but not limited to authenticated access, encrypted data, encrypted transport, data transfer control, and/or the like. In one embodiment, since the Environment may operate offline, the Environment may communicate with the Corporate Connectivity module 212f of Shell Interfaces 212 to synchronize data from the Transfer Plane 203.

A Payload type of Application 210b may include, but not limited to applications running locally accessing corporate data that resides remotely. For example, in one implementation, an Application 210b may include, but not limited to a web browser based client or custom application, and/or the like. An Application 210b may be employed by institutional portals, virtual NDC with softphone, iPhone applications, and/or the like. In one embodiment, an Application 210b may be constrained from data and applications such as authenticated access, encrypted transport, data transfer control and/or the like.

A Payload type of Presentation 210c may include, but not limited to access to corporate remote session, and may only be available when connected. For example, in one implementation, a Presentation 210c may include technologies such as, but not limited to independent computing architecture (ICA) client, remote desktop protocol (RDP), and/or the like. A Presentation 210c may be employed by iPhone RDP, and/or the like. In one embodiment, a Presentation 210c may be constrained from data and applications such as trusted access client, authenticated access, encrypted transport, and/or the like.

In one embodiment, the User Plane may backup previous versions of Payload and maintain as Payload backup 211 to facilitate Payload recovery. For example, in one implementation, if a new Payload version introduces a problem, the User Plane may resort to Payload backup 211 for quick recovery. In one embodiment, Payload may be backup based on different types, as Environment backup 211a, Application backup 211b and Presentation backup 211c.

In one embodiment, a Payload 210 may reside in a Bubble 208, and a Shell 206 may further manage and harden the Bubble and the Payload within the Bubble via control of the available Shell Interfaces 212. In one embodiment, a Bubble may be a mechanism that allows the abstraction of a computer system's main components. For example, in one implementation, a Bubble 208 may be hardware that allows Type I and Type II hardware virtualization. For another example, a Bubble 208 may be aspects of the Operating System such as the File System, Registry, Services, COM, and/or the like, which allow OS encapsulation and Application Virtualization (aka Type III OS Virtualization).

In one embodiment, Payload, Bubble, and Shell may be separate elements. In another embodiment, the SRAP PLATFORM operation may integrate two or all three elements. For example, in one implementation, an e-mail or market data application developed to be installed directly on an iPhone that meets the specification of the SRAP PLATFORM may be the Payload, Bubble and Shell all in one. For another example, a virtual corporate Laptop implemented via a solution such as Microsoft MEDV\Kidaro or MokaFive may have each one of the three elements clearly separated in the SRAP PLATFORM operation. In this example, the corporate OS plus applications embedded therein may constitute the Payload; the Bubble may be the Type II Hypervisor in use, such as, VMware Player, VirtualPC, and/or the like; and the Shell may be a management agent application that controls all interfaces the Bubble provides, such as the Microsoft MEDV\Kidaro, MokaFive Agents and/or the like. Different types and examples of Bubble structure will be further illustrated in FIG. 3A-3F.

In one embodiment, a Shell 206 may control a number of Shell Interfaces 212 to serve as a controlled single point of entry into the Payload. Shell Interfaces 212 may provide conduits via which all Payload transmissions and other processes related to the Shell 206 are transacted. In one embodiment, Shell Interfaces 212 may include modules to perform Authentication 212a, Validation 212b, Payload Management 212C, Data Control 212d, Peripherals 212e, Corporate Connectivity 212f, Shell Management 212g and/or the like. In one embodiment, the Authentication module 212a may receive user credential(s) to grant access to the Shell and Payloads; the Validation module 212b may verify the integrity of the Shell and Payload; the Payload Management module 212C may enable management and protection of the Payload inside the Shell; the Data Control module 212d may protect data to prevent data leakage from the Shell and to ensure new data is delivered to valid Shell instances; the Peripherals module 212e may control and authorize access to host peripherals; the Corporate Connectivity module 212f may synchronize data with the corporate and the Payload inside the Shell; the Shell Management module 212g may validate and enforce control policies received from the Control Plane to control interface behaviors.

In one embodiment, the behavior of Shell Interfaces 212 may be determined by the policies defined in a Manifest generated by the Control Plane 204 and made available via the Transfer Plane 203. For example, in one implementation, the Manifest may determine Shell general policies, Authentication policies, Payload policies, Data policies, Peripheral policies, and or the like. The Manifest may be generated and stored in a variety of data formats (e.g. text, xml, etc.), and may take a form similar to the following:

[Manifest Identification]
Manifest.TimeStamp=0/21/2008-19.03.46
Manifest.Signature=GFjhhjhjFHGghBbiJKhjk8098Hkjb56-7567GjhbvJHhgHKJH

[Shell General Policies]
Shell.Version=2.1
Shell.EnforceVersion=True
Shell.State=Active (or Locked, Self-Destruct, etc.)
Shell.AllowUserDestroy=True
Shell.CheckinFrequency=Every 15 min
Shell.ExpireDate=Sep. 12, 2010
Shell.OnExpire.Action.Shell=Destroy
Shell.OnExpire.Action.Payload=Destroy
Shell.OfflinePeriod=30 days
Shell.OnPeriodEndAction.Shell=Lock
Shell.OnPeriodEndAction.Payload=None
Shell.AllowChallengeResponseUnlock=True
Shell.LockOnIdleTime=True
Shell.LockOnSleep=True
Shell.LockOnHibernate=True
Shell.IdleTime=30 min
Shell.UpdateManifestOnDemand=Active
Shell.PromptToDownloadPayload=False
Shell.PromptToDownloadShell=False
Shell.PromptToUpdatePayload=True
Shell.PromptToUpdateShell=True
Shell.ResumeInterruptedDownload=True
Shell.MemoryUtilization=[Host<512 MB Shell=128 MB, Host<1024 MB Shell=256 MB, etc]
[Authentication Policies]
Auth.Offline=True
Auth.AllowpasswdChange=True
Auth.ChangePasswdNow=False
Auth.EnforcePasswdComplexity=True
Auth.DefinePasswdComplexity=Rules defining complexity such as min password length, letters and numbers, etc.
Auth.AlwaysCheckOnlineFirst=True
Auth.RevalidateOnReconnection=True
Auth.AllowFailAttempts=4
Auth.LockPeriodOnFailure=30 min
Auth.LogtFailure=True
Auth.SingleSignOn=True
Auth.PassCredentialsToApp=True
[Validation Policies]
Val.AppWhiteList=[App1, App2, App3, etc.]
Val.AdminExceptionAllowed=True
Val.RecheckValidationPriorToAccess=True
Val.Host=[Host OS=certain OS versions, Host RAM=X MB, Host CPU=X GHz, Host FreeDisk=X GB]
[Payload Polices]
Payload.Version=3
Payload.EnforceVersion=False
Payload.KeepPreviousVersions=1
Payload.Name=ABC1234
Payload.MAC=00:50:56:30:AA:AF [assuming OS implementation of Payload)
Payload.Revert=true (assuming VM implementation. See Data section for data persist exemptions)
[Data Policies]
Data.Persist=True
Data.Persist,Areas=["C:\Documanets and Settings\User\My documents",
"C:\ImportantAppData", HKCU\Software\AppSettings", etc.]
Data.BackupOutOfBand=true
Data.SyncEmailOutofBand=True (advanced feature)
Data.AllowTextPasteIn=True
Data.AllowClipPateIn=False
Data.AllowFileTransferin=False
Data.AllowTextPasteOut=False
Data.AllowClipPateOut=False
Data.AllowFileTransferOut=False
Data.AllowInShellCopyPaste=True
Data.LogAllInOutAttempt=True
Data.UpdateEncryptionKey=True
[Peripheral Policies]
Per.AllowHostNetwork=True
Per.UseNAT=True
Per.UseFirewall=True
Per.FirewallRules=[Allow Out IPSEC 34.56.78.90:8080, Allow In UDP 34.56.78.90:8081, etc.]
Per.SitesWhitelist=[*.gs.com]
Per.SitesBlackList=[some sites]
Per.Automatically.Reconnect=True
Per.PublishApps=[App1, App2, App3, etc.]
Per.PublishDesktop=False
Per.AllowHostDesktopView=True
Per.AllowHostDesktopSimultaneousInteract=True
Per.AllowPrintScreenOfShell=False
Per.AllowKeyLoggingOfShell=False
Per.AllowAudio=True
Per.AllowPrinting=True
Per.AllowPrintingToFile=False
Per.AllowHostDsikMount=False
Per.AllowOpticalDrive=False
Per.AllowUSB=see List
Per.AllowUSBList=[USB Device Type A, Type B, etc]
Per.LogAllAction=True In one embodiment, the Shell Interface modules 212a-212g may be implemented for different Payload types based on the policies received from the Control Plane. For example, in one implementation, the Shell Interface modules 212a-212g may perform in compliance with a plurality of security and manageability requirements, and other specifications as illustrated in Appendices 1A-B and 2A-G.

In one embodiment, the Shell 206 may securely maintain a locally cached copy of Manifest(s) 214 received in the User Plane. In one embodiment, the Shell 206 may securely maintain a locally cached set of user credentials 216 to facilitate Authentication 212a at Shell Interfaces 212 for Shell access.

In one embodiment, the User Plane 202 may communicate with the Transfer Plane 203 via a communication network 213, e.g. the Internet. In one embodiment, the Transfer Plane 203 may send updated Manifests to the Shell Interfaces 212, and based on the policies in the Manifests deploy updates of Payloads to the Shell Interfaces 212 via a control channel, referred to as the "Out of Band" Channel 218. For example, in one implementation, the Transfer Plane 203 may deliver Payload content 220 obtained from the Control Plane 204 onto an Out of Band channel 218 from a DMZ, a Hosted infrastructure, and/or the like. In one embodiment, the Out of Band channel may be connected and used by the Shell 206 even if no user is actively engaged with the Payload and/or the Payload is not active. In that case, online authentication with the Shell may be implemented to receive updates of Manifests and Payloads.

In one embodiment, the Payload content 220 may comprises: contents of Environment 220a, contents of Application 220b, contents of Presentation 220C, a Shell provider 222 and a Manifest(s) provider 124. In one embodiment, the Shell provider 222 may provide the Shell 206 components, such as, but not limited to installers, binaries, their updates, and/or the like, such that the host computing environment of the Shell may establish and/or install a trusted Shell environment based on the received components. In one embodiment, the Manifest provider 224 may make available the manifest generated in the Control Plane 204 for the Shell 206 of the User Plane 202 to fetch.

In one embodiment, a connection between an Data Connection Interface 228 of the Transfer Plane 203 and the Corporate Connectivity module 212f of the Shell Interfaces 212 may be established to facilitate data transfer, referred to as an "In-Band" channel 219. The In-Band channel 219 may be an authenticated, authorized and secure data transfer channel, such as, but not limited to a Virtual Private Network (VPN) over which corporate and user data is transmitted. In one implementation, the In-Band channel 219 may be established when the Payload within the Shell is in use, i.e., when a user (User Plane/Shell) attempts to connect to the corporate network (Control Plane) to access corporate resources.

In one embodiment, the Control Plane 204 may generate Payload content 230 (including Environment content 230a, Application 230b and Presentation 230c) and deliver the generated Payload contents to the Transfer Plane 203. In one embodiment, the Control Plane 204 may generate Resultant Manifest 234 using Policy and Payload Management Tool (PPMT) 236, which is a utility or set of utilities that facilitates the generation of Payload versions and policy-bearing Manifests. In one embodiment, the PPMT 236 would reference Corporate Directory Services 238 so that policies apply to user or user groups and are tied to certain types or versions of payload. In one implementation, the PPMT 236 may facilitate data gathering and reporting.

In one embodiment, the Control Plane 204 may obtain data from the corporate Intranet 240, and deliver the data to the Data Connection Interface 228 of the Transfer Plane 203. For example, the delivered data may include, but not limited to user requested files from a corporate document system, emails, voicemails, and/or the like.

Figure 3A:
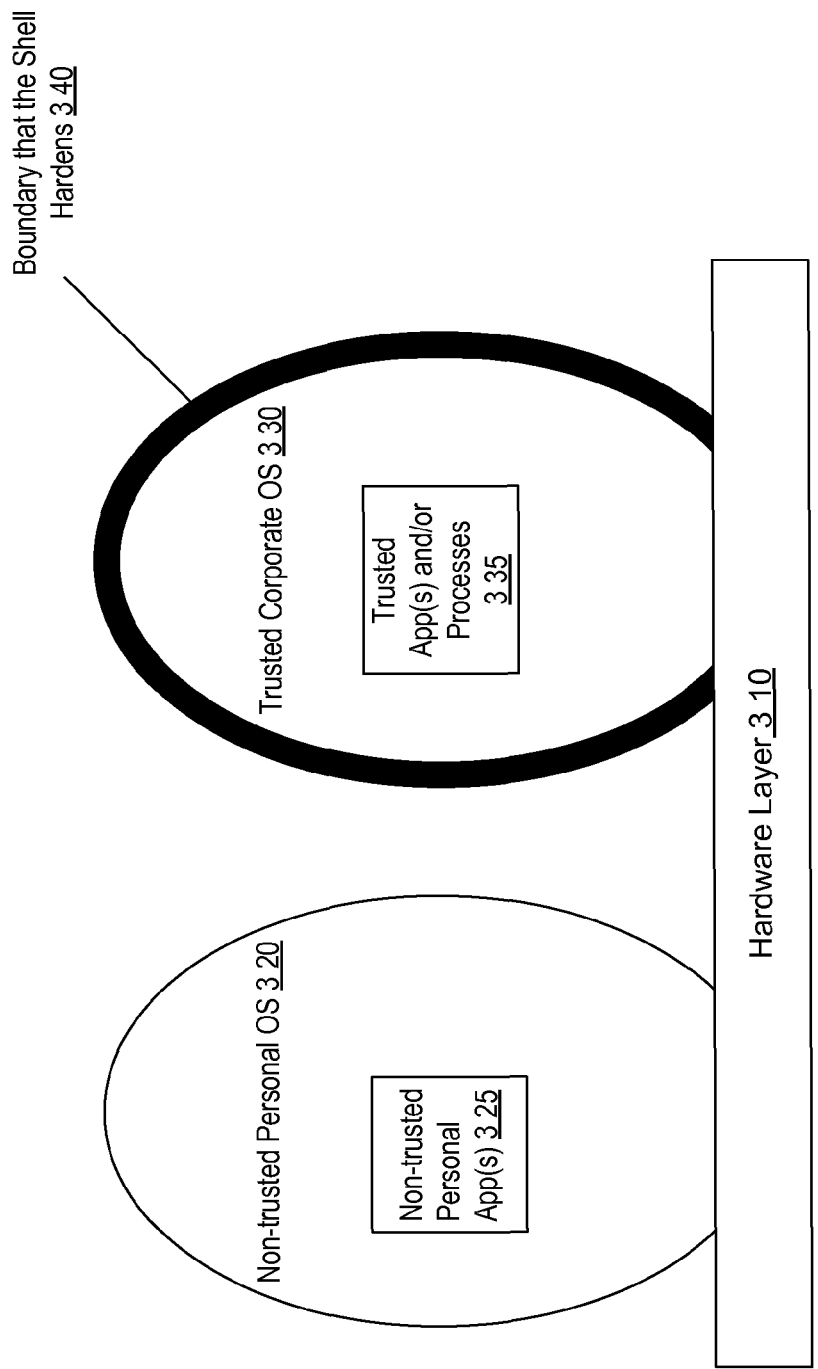
FIG. 3A-3F provide diagrams illustrating aspects of different types of Bubble structure of the SRAP PLATFORM within embodiments of the SRAP PLATFORM operation.

FIG. 3A-3E illustrate different types of Bubble mechanisms. In FIG. 3A, a Type 0 Bubble structure without any hypervisor is illustrated. In one embodiment, a non-trusted personal OS(s) 320 and a trusted corporate OS(s) 330 may be booted separately on the hardware layer 310 of a user device, with non-trusted personal applications and processes 325 and trusted applications and processes 335 running on each of them, respectively. In one implementation, the trusted corporate OS may define the boundary that a Shell hardens 340, i.e., the boundary of the Bubble. For example, in one implementation, completely different bootable real OS(s) (e.g. BartPE, Linux+Wine, etc.) may be implemented on the media sector of a personal device, such as a bootable USB stick, a DVD, a partition of a personal machines hard disc, and/or the like. In one embodiment, Type 0 Bubble structure may be compatible with Mac hardware.

Figure 3B:
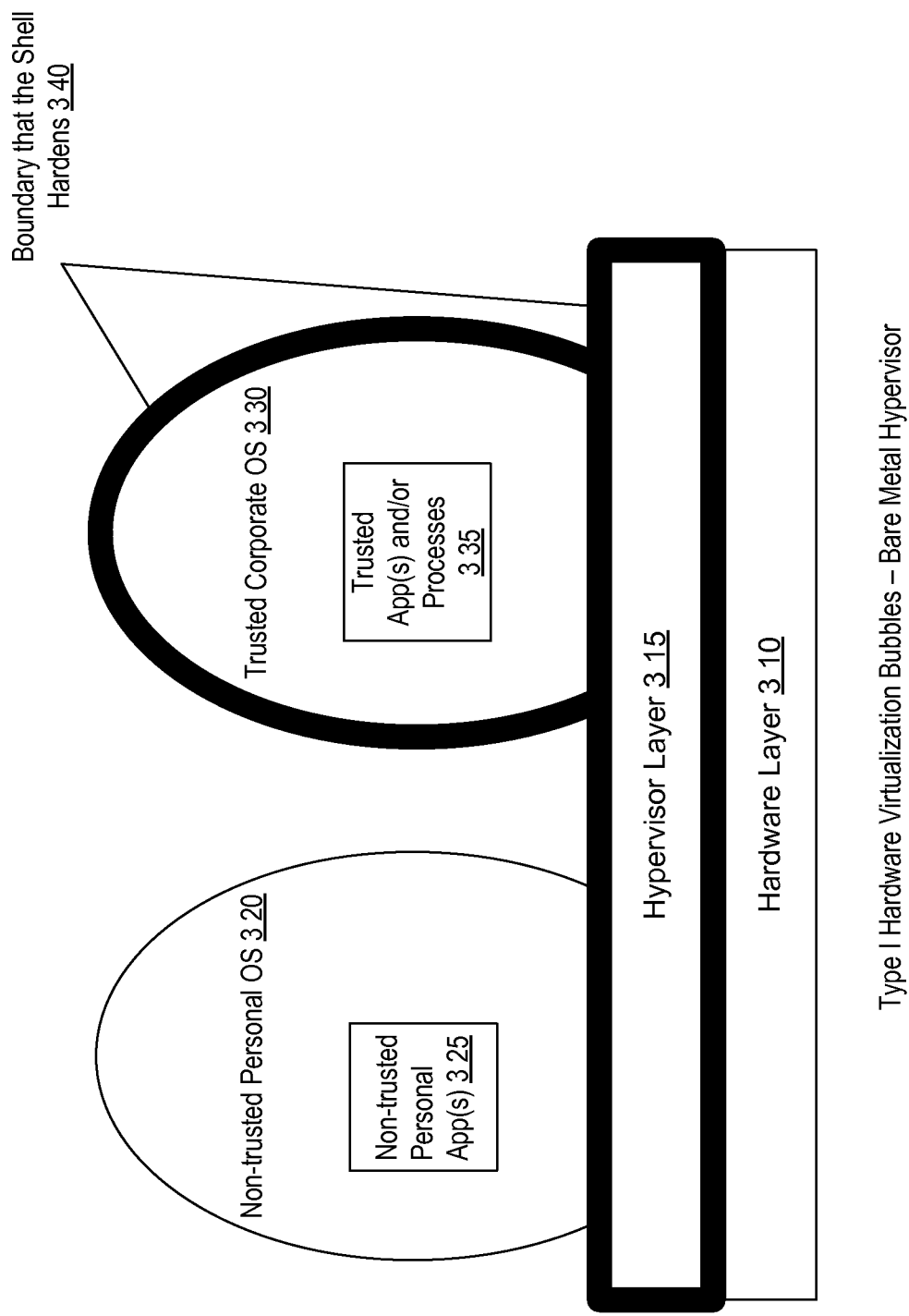

FIG. 3B shows a Type I Bubble structure with hardware virtualization Bubbles. In addition to the Type 0 structure illustrated in FIG. 3A. In one embodiment, a hypervisor layer 315, for example, a bare metal Type I hypervisor, may host both the non-trusted personal OS 320 and the trusted corporate OS 330 which may run simultaneously but separately from each other. For example, in one implementation, the Type I hypervisor may be include, but not limited to Neocleus Virtualization solutions, Intel/AMD hardwares that have hypervisors built-in. In one implementation, the trusted corporate OS 330 and the hypervisor layer 315 may together define the boundary that the Shell hardens 340. In one embodiment, Type I Bubble structure may be compatible with Mac hardware.

Figure 3C:
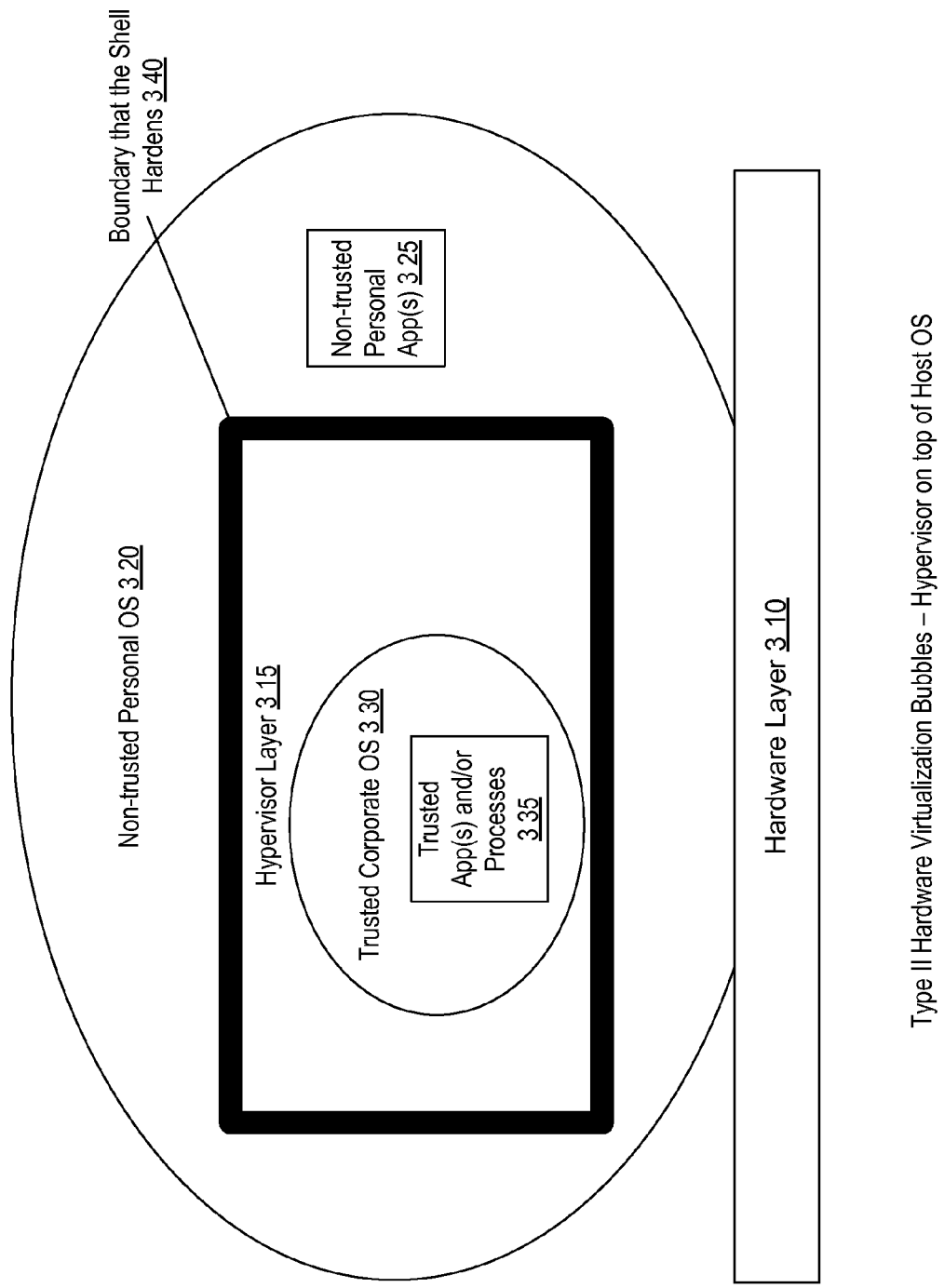

FIG. 3C shows a Type II Bubble structure with hardware virtualization bubbles but with hypervisor on top of host OS. In one embodiment, a trusted corporate OS 330 may run on top of a non-trusted personal OS 320, separated by a Type II hypervisor 315 that emulates hardware. For example, in one implementation, the Type II hypervisor may be vended by ACE, MOkaFive, MEDV\Kidaro, vThere, QEMU, Virtual Box, Parallels HV, and/or the like. In one embodiment, the hypervisor layer 315 may define the boundary that the Shell hardens 340.

Figure 3D:
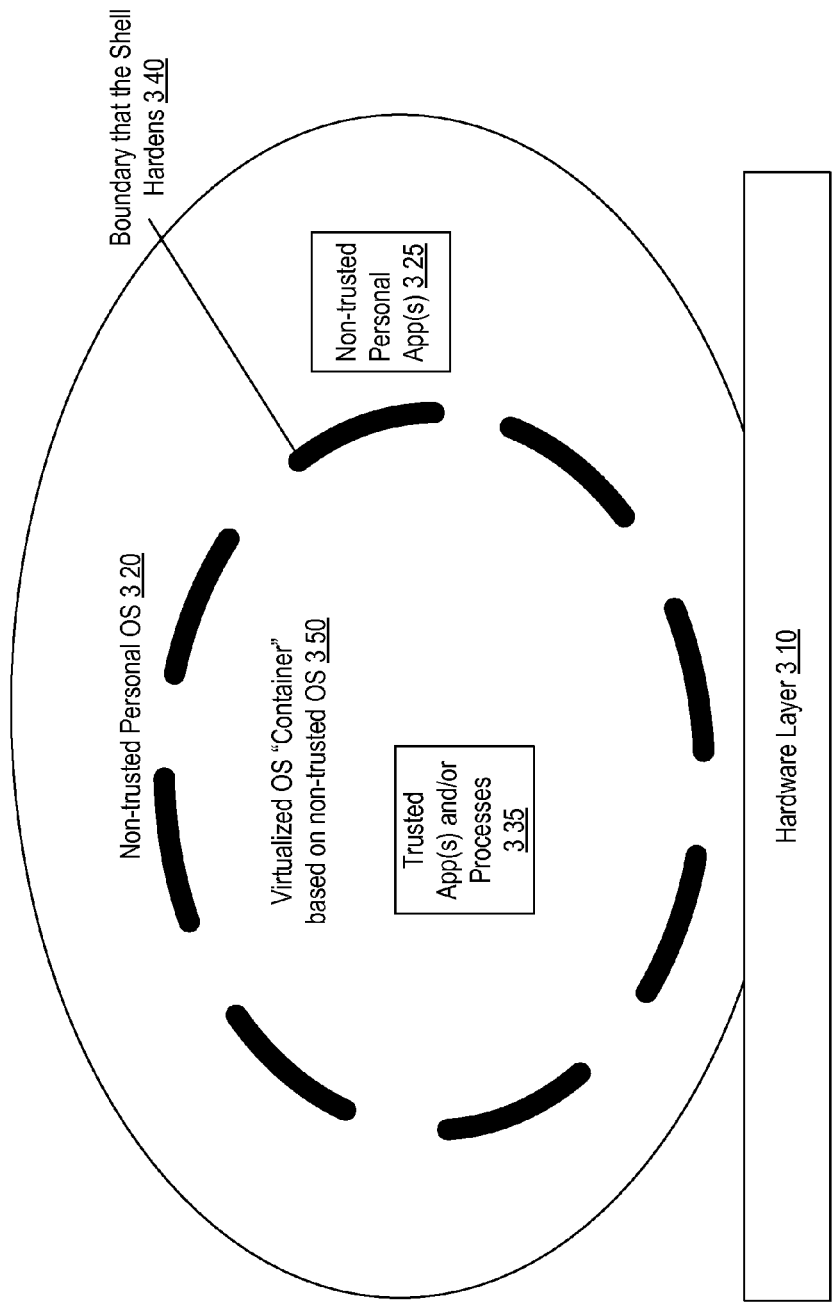

FIG. 3D shows a Type II Bubble structure with virtualization Bubbles which may serve as application containers. In one embodiment, a trusted corporate OS may not be available, and thus the non-trusted personal OS 320 may be partially virtualized (e.g. registry, desktop, etc.) to form a virtualized OS "container" 350 such that the corporate trusted applications and processes 335 may be implemented separately from the non-trusted personal applications 325. In that case, the virtualized OS container 350 may partially define the boundary that a Shell hardens 340. In one embodiment, Type II Bubble structure may be implemented from a USB without administrator on host due to the light delivery and high portability (no corporate OS, just applications). For example, in one implementation, Type II Bubble with virtualized OS container may be implemented by software tools such as, but not limited to, MojoPac, InstallFree, Trigence, Parallels Virtuozzo, and/or the like.

Figure 3E:
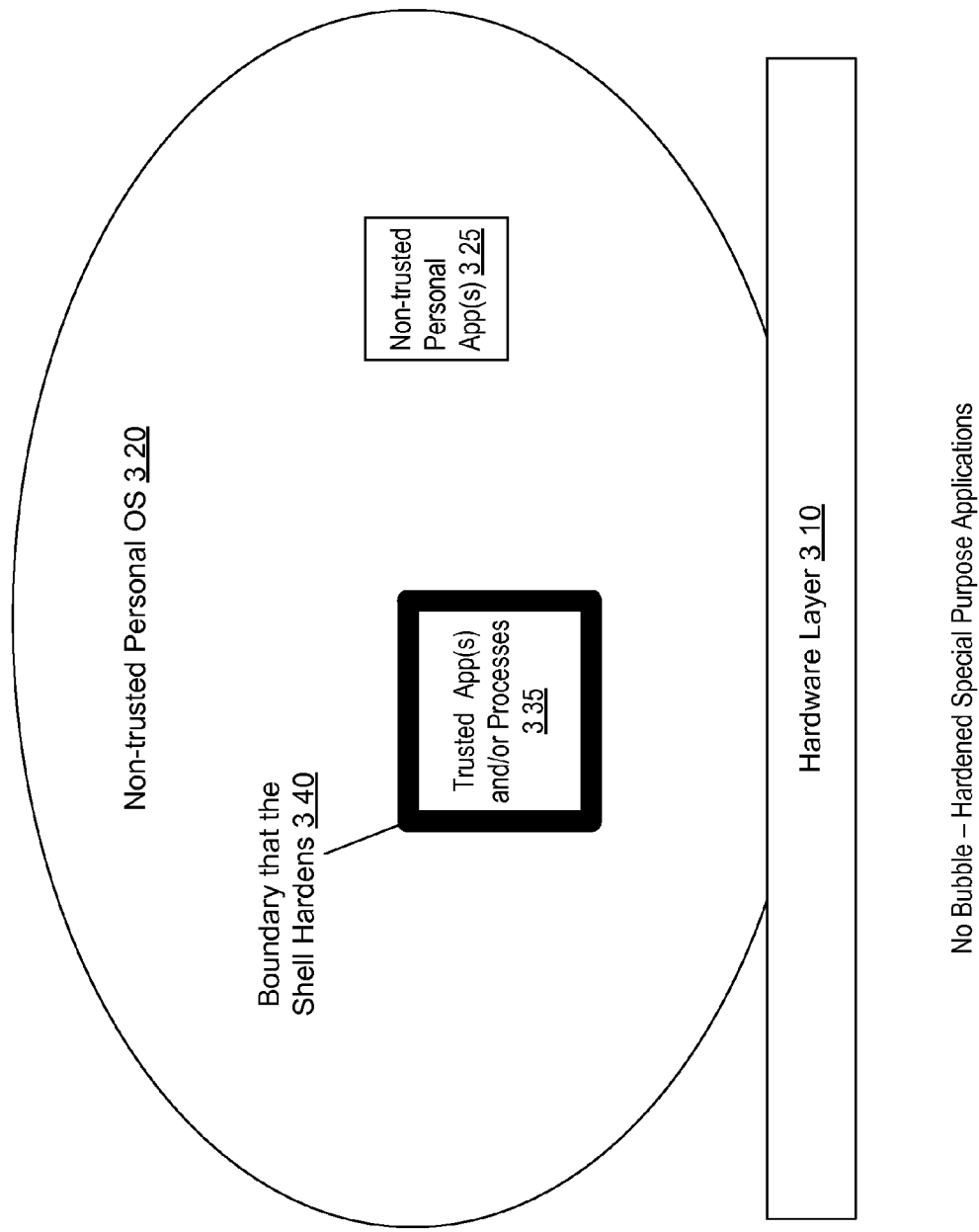

FIG. 3E illustrates a scenario in which there is no Bubbles, and special purpose applications are hardened by a Shell directly. In one embodiment, trusted applications 335 and non-trusted applications 325 may both be installed and implemented on a non-trusted personal OS 320. The Shell may directly hardens the boundary 340 of the trusted applications 335 by technologies and applications such as, but not limited to Native Apps, Liquid Machines, Connectors to terminal services (ICA client), and/or the like.

Figure 3F:
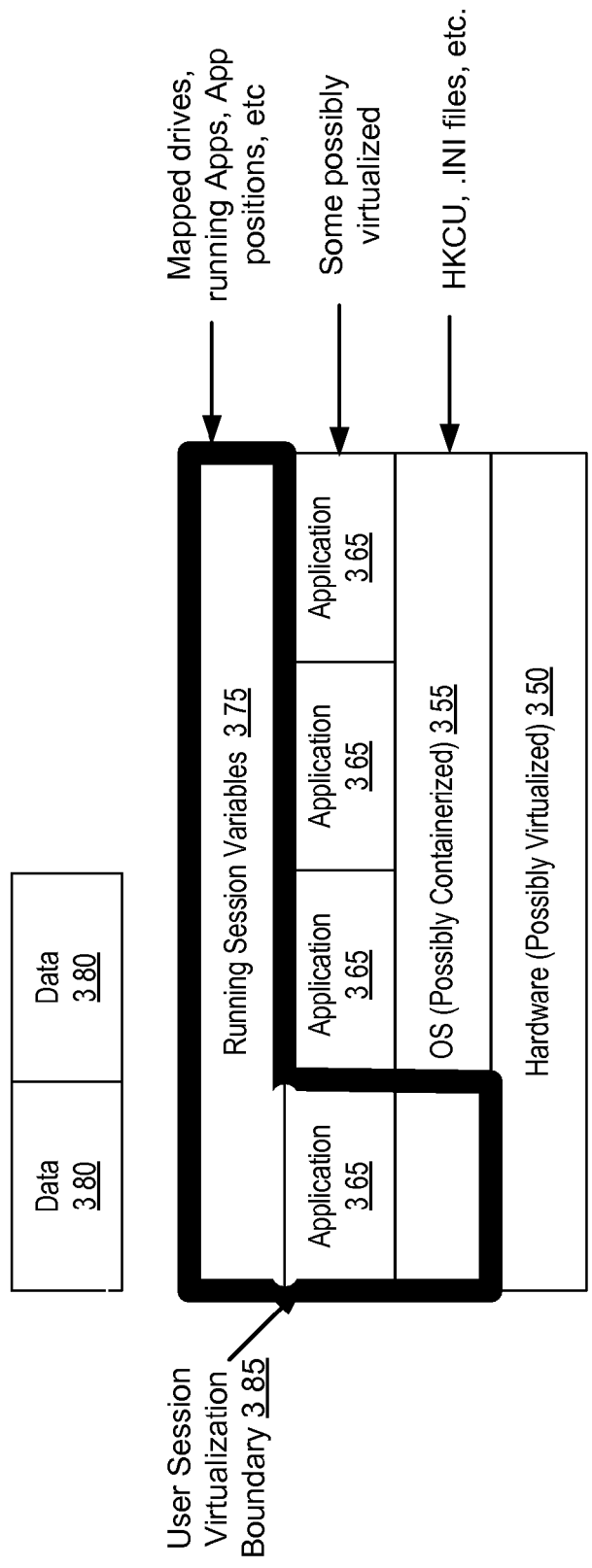

FIG. 3F shows a Type "U" Bubble with user session virtualization. In this framework, all the relevant components that comprise the "User Session" as defined by a given entity (for example, a corporation, or even a specific user), may be grouped in such a way that they can be separated from underlying or adjacent components. Such components could be comprised of running session variables 375, such as, but not limited to user settings and preferences stored in files or registries, network mappings, application states (such as running applications, application locations, window sizes, etc.), and even possibly applications themselves. However, User Data 380 (as in document files or e-mail content, for example) would explicitly still be kept separate from this framework. In one embodiment, the hardware 350 may be possibly virtualized, and the OS 355 may be possibly containerized as in Type III in FIG. 3D. In one embodiment, part of the OS, such as the registry settings including HKEY_CURRENT_USER (HKCU), .INI files, etc., the running applications 365 and other running session variables may be virtualized to form a Bubble. In one embodiment, the user session virtualization boundary 385 may define different states of the session, such as suspension, pause, resume, capture, and/or the like. In one implementation, the Type U user session virtualization Bubbles may be implemented by technologies and software tools such as, but not limited to VMware, Citrix Systems, RES Software, and/or the like.

Figure 4A:
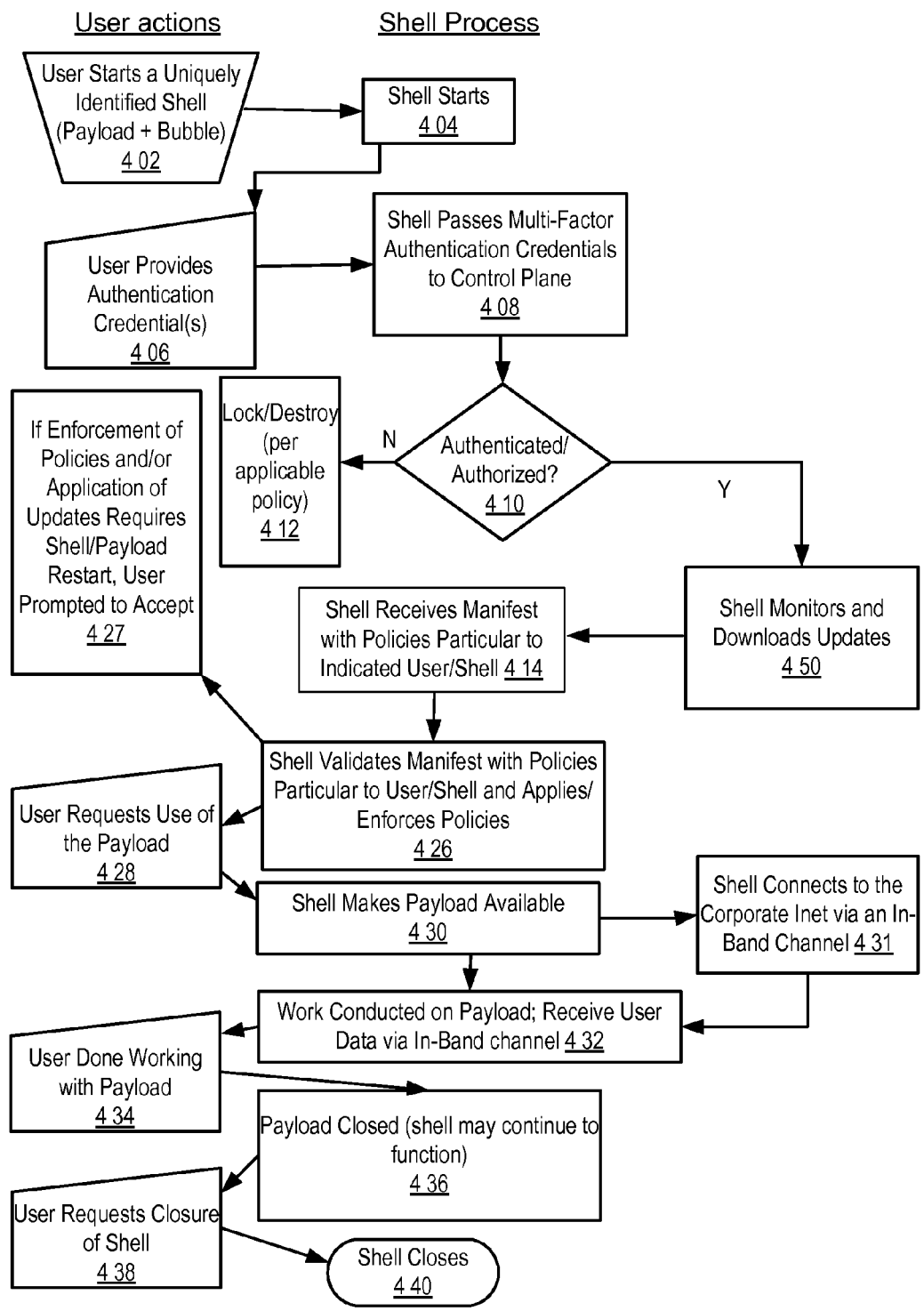
FIG. 4A-4C provide logic flow diagrams illustrating aspects of implementing the SRAP PLATFORM within embodiments of the SRAP PLATFORM operation.

FIG. 4A provides a diagram of general logic flow illustrating aspects of user actions and shell processes of the SRAP PLATFORM User Plane in one embodiment of the SRAP PLATFORM operation. In one embodiment, a user may starts a uniquely identified Shell 402, with Payloads and/or Bubbles embedded therein, and the Shell may then be triggered to start 404 by the user action. For example, in one implementation, the user may launch a trusted corporate application to access corporate network from a non-trusted device, and the Payload (the trusted corporate application) may become active. In one embodiment, the user may provide authentication credential(s) 406 to the Shell, and the Shell may then pass on the authentication credentials to the Control Plane 408 through the Shell Interfaces. For example, in one implementation, the authentication credential(s) may be a multi-factor credential, i.e. a mechanism wherein at least two different factors, such as a virtual token, mobile signature, the physical address of the user device, and/or the like, are used in conjunction to authenticate. In one embodiment, if the Shell receives positive authentication decision from the Control Plane 410, the Shell may proceed to receive Manifest(s) from the Control Plane. If the authentication is not successful 410, the Shell process may be locked or destroyed according to the applicable policy 412. In one implementation, the Shell process may communicate with the user interface of the non-trusted environment, e.g. the non-trusted personal OS, and present a message "connection failed" to the user. In one implementation, the Shell process may store the target corporate resource in the local database as inaccessible by the non-trusted environment.

Figure 4B:
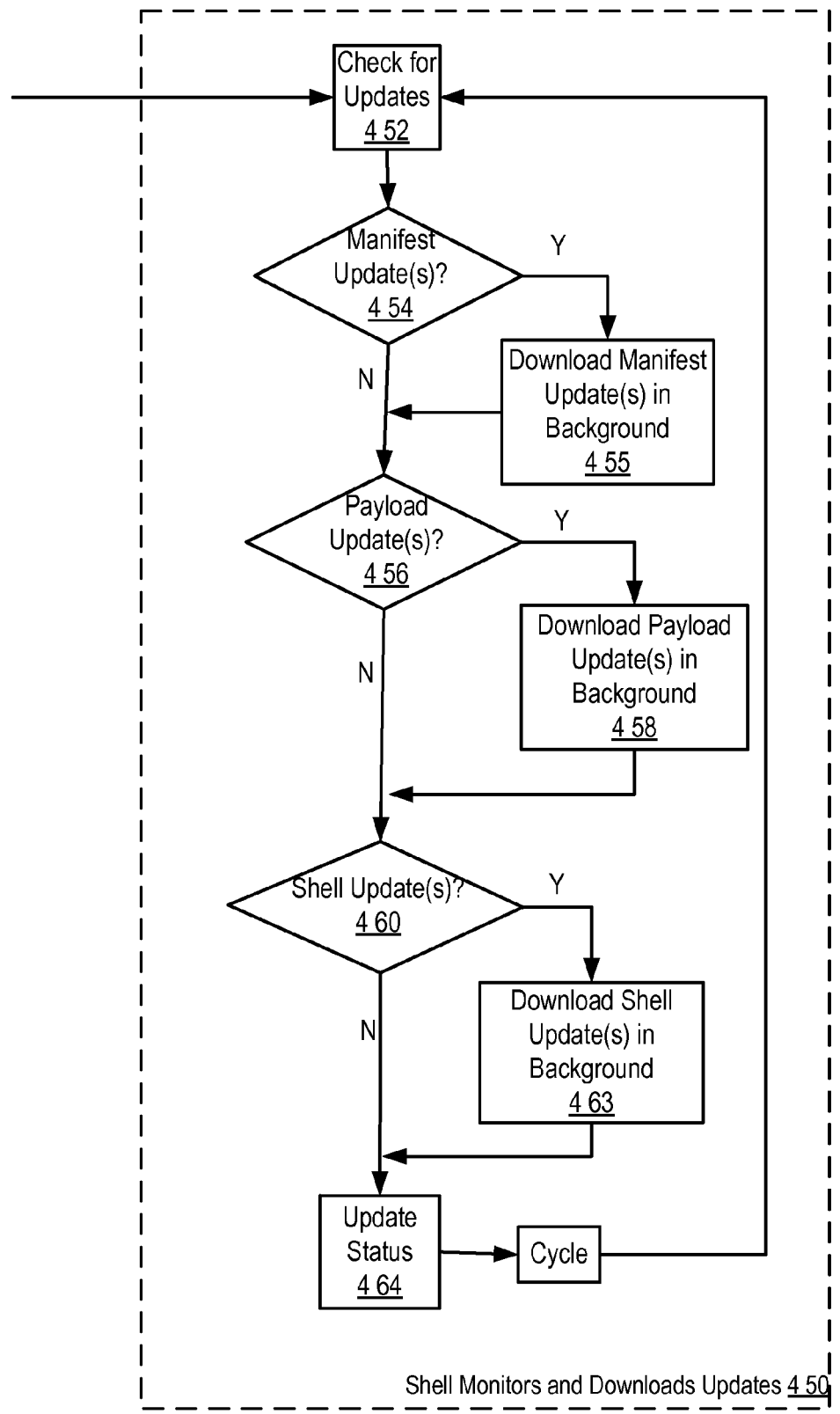

In one embodiment, after successful authentication with the Control Plane, the Shell may monitor and download updates from the Transfer/Control Plane 450 via an Out-of-Band (control) channel, as will be illustrated in FIG. 4B. In one embodiment, the Shell may receive Manifest(s) containing policies that control the interface behaviors of particular user(s) and Shell(s) 414, and then validate the received Manifest (policies) and apply the polices to control behaviors of Shell Interfaces 426. In one implementation, the received updates and applied policies may require the Shell/Payload to restart. In that case, the user may prompt to restart the Shell/Payload 427. In another implementation, the user may request to start use of the Payload 428 associated with the Shell process, and the Shell may thus make the Payload available 430 upon user requests. In one embodiment, based on the particular Payload, the Shell may connect to the corporate intranet via an In-Band channel 431, for example, for data transfers, etc. The Shell may then work conducted on the Payload and receive user data via the In-Band channel 432. In one implementation, the Shell may establish a VPN accessing the corporate network and implement the trusted corporate application over the VPN connection. In another implementation, the Shell may download User Data from the corporate network through the VPN connection and close the connection to work offline. When the user finishes working on the Payload 434, the Shell may close the Payload 436. In one embodiment, the Shell may continue to function. For example, in one implementation, the Shell may keep monitoring and downloading updates from the Transfer/Control Plane via the Out-of-Band channel. In one embodiment, the user may request to close the Shell 438, and the Shell may then close and end the Shell process 440.

FIG. 4B provides a logic flow diagram illustrating aspects of the Shell monitoring and downloading updates from the Transfer/Control Plane in one embodiment of the SRAP PLATFORM operation. In one embodiment, the Shell may monitor and check for updates constantly, periodically and/or intermittently. In one embodiment, the Shell may send probing packets to the Transfer Plane to check for updates 452. If there is Manifest updates 454, the Shell may download Manifest updates and update its local cached copy. Otherwise, the Shell may proceed to check if there is any Payload updates 456. If yes, the Shell may download and implement the Payload updates 458, and keep a backup copy of the old Payload version. Otherwise, the Shell may proceed to check if there is any Shell updates 460, and download and implement Shell updates 463. In one embodiment, the Shell may update its status 464 with the newly downloads, and then cycle to start the process again at 452.

Figure 4C:
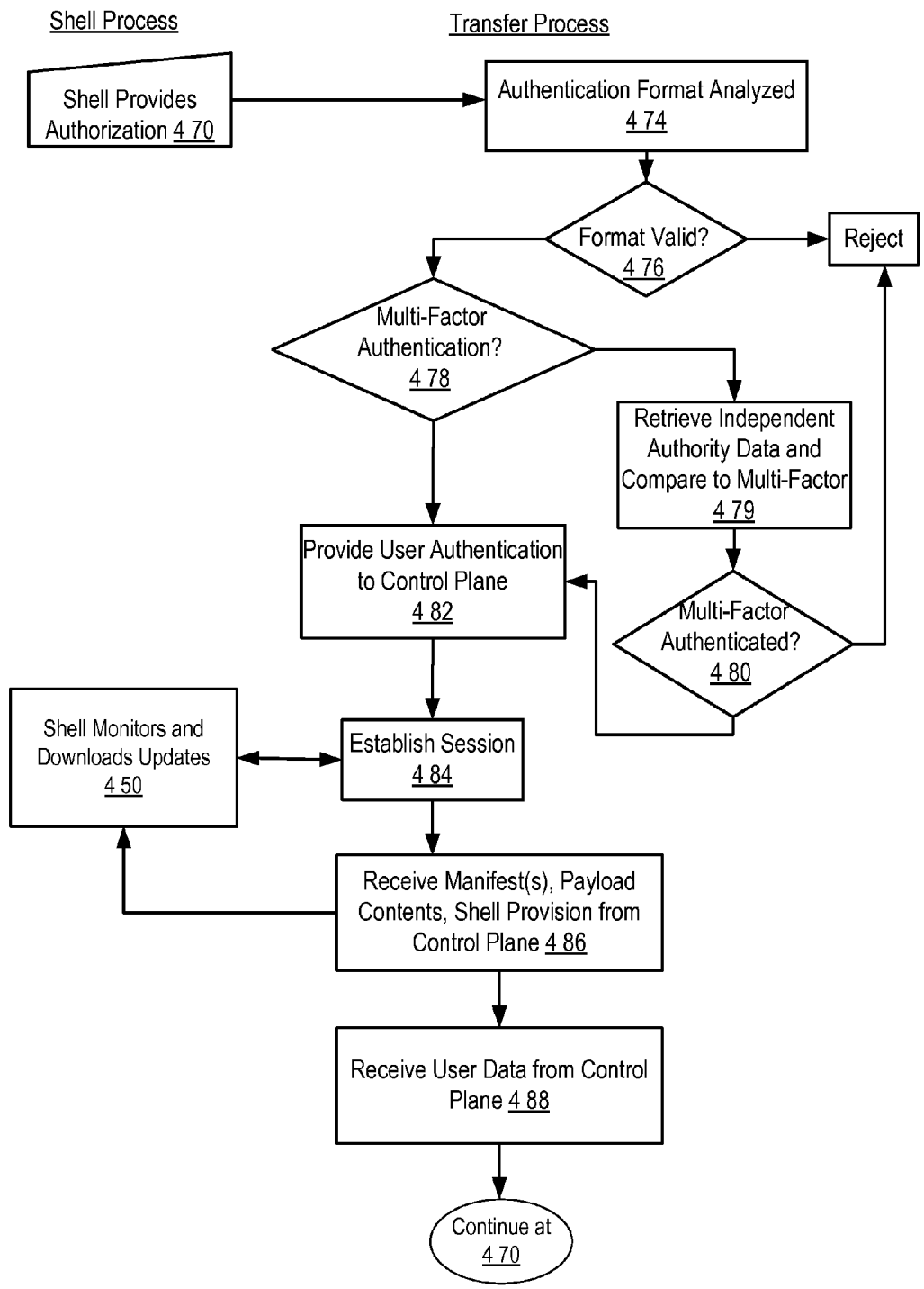

FIG. 4C provides a logic flow diagram illustrating aspects of work flows of the SRAP PLATFORM Transfer Plane in one embodiment of the SRAP PLATFORM operation. In one embodiment, the Shell may provide authentication credential(s) 13 (received from the user at 406) to the Transfer Plane. The Transfer Plane may then analyze the format of the received authentication credential(s), e.g. through input validation, etc. If the format is invalid 476, the Transfer Plane may reject any further communication from the Shell. In one implementation, the Transfer Plane may keep a record of the Shell as "unauthenticated." In one implementation, the Transfer Plane may periodically generate a list of unauthenticated Shells and send the list to a system administrator.

If the format is valid at 476, the Transfer Plane may determine whether to conduct a multi-factor authentication based on the received credential(s) 478. If yes, the Transfer Plane may retrieve independent authority data and compare it to the received multi-factor credential(s) 479. For example, in one implementation, the Transfer Plane may connect to an external network security database to retrieve security data with regard to the received credential(s) from the user. if the multi-factor authentication at the Transfer Plane is unsuccessful 480, the Transfer Plane may reject the Shell requests to access the corporate network. If the multi-factor authentication is successful 480, the Transfer Plane may then provide the user authentication to the Control Plane for further authentication 482, and establish a user session 484 with the Control Plane. For example, in one implementation, a life-limited session token may be adopted to establish the user session. In one embodiment, the Transfer Plane may download updates 486 from the Control Plane, such as, but not limited to Manifest updates, Payload contents, Shell provisions, an/or the like. Such updates may be made available at the Transfer Plane for the Shell to download 450 via the Out-of-Band channel, as illustrated in FIG. 4B. In one embodiment, the Transfer Plane may receive User Data from the Control Plane 488 and made available to the Shell. In one embodiment, the Shell may send requests via the user session to check for updates from the Control Plane. In one embodiment, the Transfer Plane may continue at 470.

Figure 5:
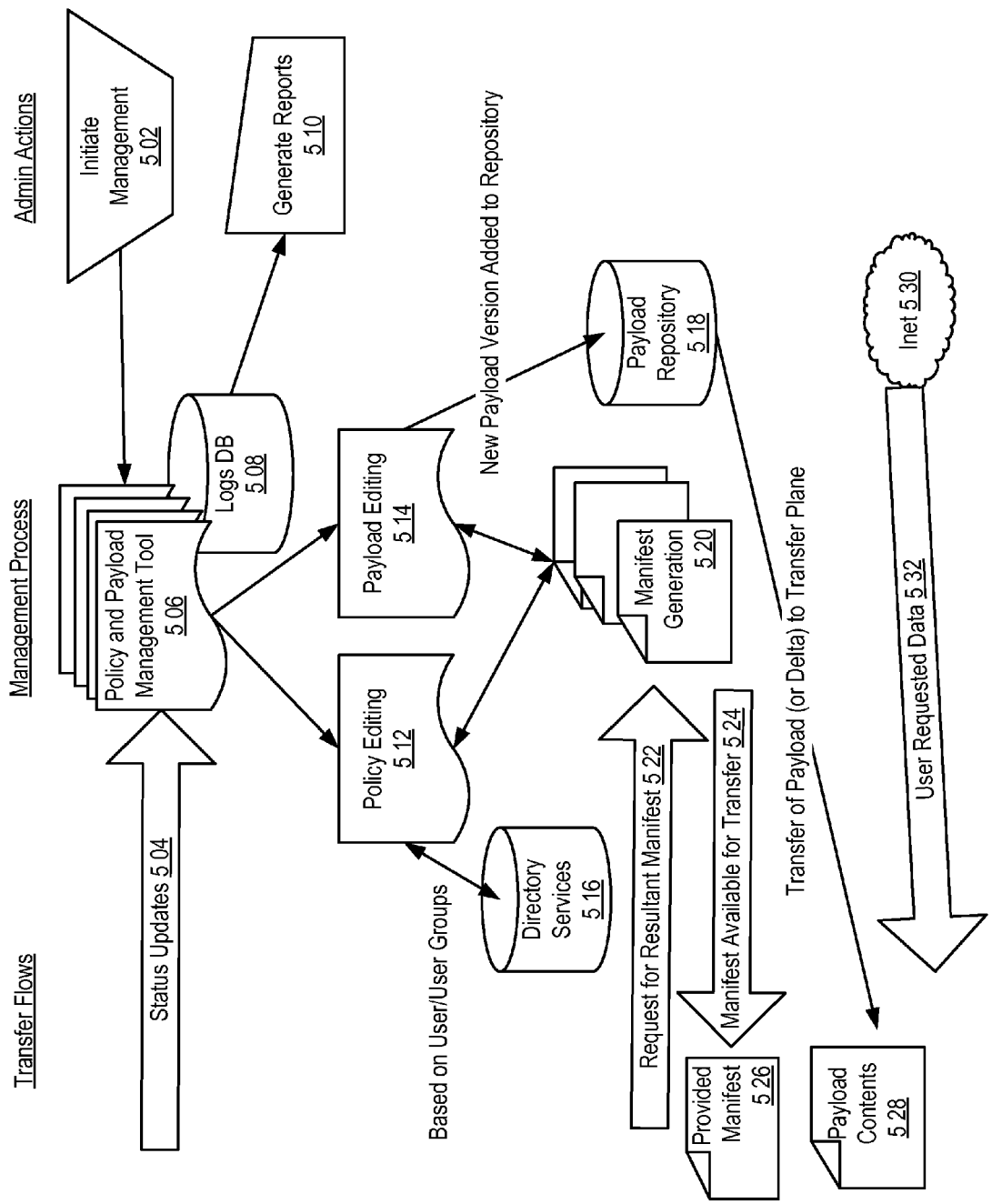
FIG. 5 provides a diagram of combined logic flows and data flows illustrating aspects of management process of the SRAP PLATFORM in one embodiment of the SRAP PLATFORM operation.

FIG. 5 provides a diagram of combined logic flows and data flows illustrating aspects of management process of the SRAP PLATFORM Control Plane in one embodiment of the SRAP PLATFORM operation. A system administrator may initiate the management 502, for example, by logging into the SRAP PLATFORM Control Plane via an interface, etc, and may then be directed to a page of Policy and Payload Management Tool (PPMT) 506 of the Control Plane. In one embodiment, the PPMT 506 may receive updates of Shell status 504 from the Transfer Plane. For example, the PPMT 506 may receive a multi-factor authentication data of the Shell process, an indication as to whether the Shell has been approved by the Transfer process, details of Payload requests, and/or the like. In one embodiment, the PPMT 506 may store the policies and Payloads information in a Logs database 508, and generate management reports 510 from the stored data. For example, in one implementation, reports containing Payload historical data, analysis and statistics may be generated periodically.

In one embodiment, the PPMT 506 may access the Corporate Directory Services database 516 so as to edit policies 512 that apply to particular user(s) or user groups and are tied to certain types or versions of payload. In another embodiment, the PPMT 506 may edit Payloads 514 to add new Payload versions to the Payload Repository database 518. In one embodiment, the edited policy and Payloads may be integrated to generate resultant Manifest(s) 520. If the Control Plane receives a request for resultant Manifest 522, for example, in one implementation, from the established user session 484, the Control Plane may send the generated Manifest(s) to the Transfer Plane which may made the Manifest available 524, and eventually provide 526 to the Shell. In one embodiment, the Control Plane may retrieve Payload contents from the Payload Repository database 518 and deliver to the Transfer Plane 528. In one embodiment, the Control Plane may retrieve the User Data requested by the user from the corporate Intranet 540 and send the User Data to user via the Transfer Plane 542.

For example, in one implementation, a Shell may prompt user for credentials Shell prompts user for credentials (2-factor). Shell may establish a secure sockets layer (SSL) tunnel to a DMZ Proxy Server, and pass user credentials to the Proxy Server. In one implementation, the Proxy server may implement: SSL termination, input validation on the credentials, check of the Public Key Infrastructure (PKI) certificate of the user credential with an Independent Authority. The Proxy may establish its own SSL tunnel with the Management Server (Control Plane) of the SRAP PLATFORM, and pass the user credentials to the Management Server. In one implementation, the Management Server may check authorization and memberships with the stored Directory. If the user is authenticated, the Management Server may generate policy Manifest that applies to this user\Shell and deliver it to Shell via the Proxy Server. If so, directed by the Manifest, the Shell may establish a SSL connection to a Payload Distribution Server on DMZ such that the Shell may obtain Payload updates from the Distribution Server. In one implementation, the Payload Distribution Server may be kept in synchronization with a Backend Payload Repository where the latest Payload version is internally kept. When requested by the user, the Payload may then VPN into the Corporate networks and retrieve, synchronize, or work with Corporate, or may simply work with downloaded User Data offline.

SRAP PLATFORM Controller

Figure 6:
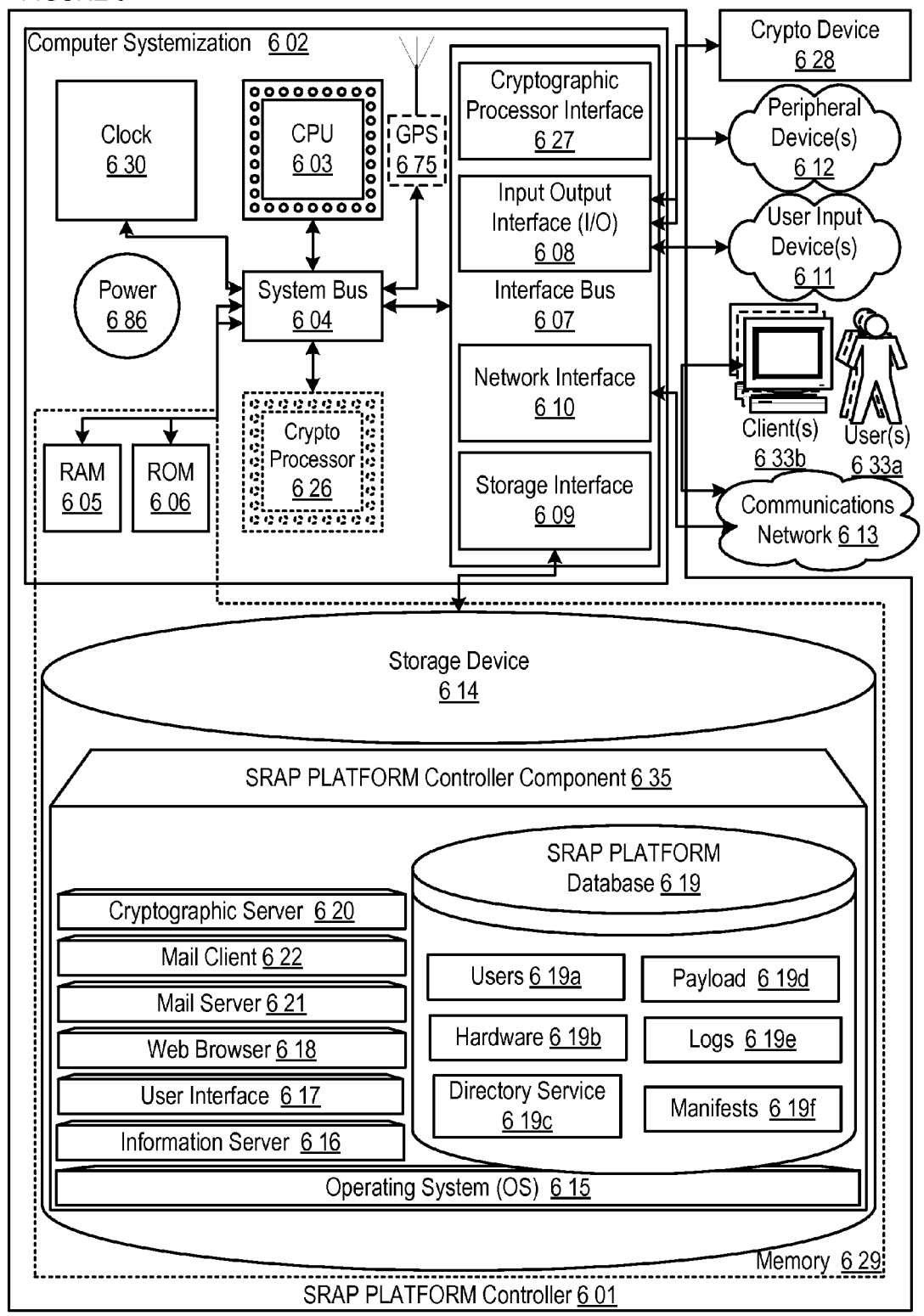
FIG. 6 is of a block diagram illustrating embodiments of the SRAP PLATFORM controller.

FIG. 6 illustrates inventive aspects of a SRAP PLATFORM controller 601 in a block diagram. In this embodiment, the SRAP PLATFORM controller 601 may serve to aggregate, process, store, search, serve, identify, instruct, generate, match, and/or facilitate interactions with a computer through virtualization technologies, and/or other related data.

Typically, users, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SRAP PLATFORM controller 601 may be connected to and/or communicate with entities such as, but not limited to: one or more users from user input devices 611; peripheral devices 612; an optional cryptographic processor device 628; and/or a communications network 613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SRAP PLATFORM controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effect communications, operations, storage, etc. Optionally, the computer systemization may be connected to an internal power source 686. Optionally, a cryptographic processor 626 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SRAP PLATFORM controller and beyond through various interfaces. Should processing requirements dictate a greater amount speed and/or capacity, distributed processors (e.g., Distributed SRAP PLATFORM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SRAP PLATFORM may be achieved by implementing a microcontroller such as CAST's R8051XC2 microcontroller; Intel's MCS 51 (i.e., 8051 microcontroller); and/or the like. Also, to implement certain features of the SRAP PLATFORM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SRAP PLATFORM component collection (distributed or otherwise) and/or features may be implemented via the microprocessor and/or via embedded components; e.g., via ASIC, coprocessor, DSP, FPGA, and/or the like. Alternately, some implementations of the SRAP PLATFORM may be implemented with embedded components that are configured and used to achieve a variety of features or signal processing.

Depending on the particular implementation, the embedded components may include software solutions, hardware solutions, and/or some combination of both hardware/software solutions. For example, SRAP PLATFORM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SRAP PLATFORM features. A hierarchy of programmable interconnects allow logic blocks to be interconnected as needed by the SRAP PLATFORM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the SRAP PLATFORM may be developed on regular FPGAs and then migrated into a fixed version that more resembles ASIC implementations. Alternate or coordinating implementations may migrate SRAP PLATFORM controller features to a final ASIC instead of or in addition to FPGAs. Depending on the implementation all of the aforementioned embedded components and microprocessors may be considered the "CPU" and/or "processor" for the SRAP PLATFORM.

Power Source

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the SRAP PLATFORM thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the SRAP PLATFORM controller is accessible through remote clients 633*b* (e.g., computers with web browsers) by users 633*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SRAP PLATFORM), architectures may similarly be employed to pool, load balance, and/or otherwise increase the communicative bandwidth required by the SRAP PLATFORM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface 19 (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SRAP PLATFORM controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the SRAP PLATFORM controller. A MC68HC16 microcontroller, manufactured by Motorola Inc., may be used for and/or within cryptographic units. The MC68HC16 microcontroller utilizes a 16-bit multiply-and-accumulate instruction in the MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the SRAP PLATFORM controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the SRAP PLATFORM component(s) 635; and/or the like (i.e., collectively a component collection). These components may be stored and accessed from the storage devices and/or from storage devices accessible through an interface bus. Although non-conventional program components such as those in the component collection, typically, are stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the SRAP PLATFORM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/ NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SRAP PLATFORM controller to communicate with other entities through a communications network 613. Various communication protocols may be used by the SRAP PLATFORM controller as a subcarrier transport mechanism for interaction, such as, but not limited to: multicast, TCP/IP, UDP, unicast, and/or the like.

Information Server

An information server component 616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SRAP PLATFORM controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SRAP PLATFORM database 619, operating systems, other program components, user interfaces, Web browsers, and/or the like.

Access to the SRAP PLATFORM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SRAP PLATFORM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SRAP PLATFORM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the SRAP PLATFORM enabled nodes. The combined application may be nugatory on systems employing standard Web browsers.

Mail Server

A mail server component 621 is a stored program component that is executed by a CPU 603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SRAP PLATFORM.

Access to the SRAP PLATFORM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SRAP PLATFORM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SRAP PLATFORM component to engage in secure transactions if so desired. The cryptographic component facilitates the secure accessing of resources on the SRAP PLATFORM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SRAP PLATFORM Database

The SRAP PLATFORM database component 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SRAP PLATFORM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the SRAP PLATFORM database is implemented as a data-structure, the use of the SRAP PLATFORM database 619 may be integrated into another component such as the SRAP PLATFORM component 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 619 includes several tables 619a-f. A Users table 619a may include fields such as, but not limited to: user_ID, user_name, user_password, contact_info, hardware_ID, payload_history, user_evaluation and/or the like. A Hardware table 619b may include fields such as, but not limited to: hardware_ID, hardware_type, hardware_name, data_formatting_requirements, protocols, addressing_info, usage_history, hardware_requirements, user_ID, and/or the like. A Directory Service table 619c may include fileds such as, but not limited to: user_ID, user_type, payload_type, payload_version, policy_ID, authentication, and/or the like. A Payload table 619d may include fields such as, but not limited to payload_ID, user_ID, payload_version, payload_request, shell_ID, shell_version, policy_ID, and/or the like. A Logs table 619d may include, but not limited to policy_ID, policy_type, policy_version, policy_history, payload_ID, payload_version, payload_history, and/or the like. A Manifests table 619f may include fields such as, but not limited to manifest_ID, manifest_timestamp, manifest_signature, shell_general, and/or the like.

In one embodiment, the SRAP PLATFORM database may interact with other database systems. For example, employing a distributed database system, queries and data access by search SRAP PLATFORM component may treat the combination of the SRAP PLATFORM database, an integrated data security layer database as a single database entity.

In one embodiment, user programs may contain various user interface primitives, which may serve to update the SRAP PLATFORM. Also, various accounts may require custom database tables depending upon the environments and the types of clients the SRAP PLATFORM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619a-f. The SRAP PLATFORM may be configured to keep track of various settings, inputs, and parameters via database controllers.

The SRAP PLATFORM database may communicate to and/or with other components in a component collection, including itself, and/or facilities of the like. Most frequently, the SRAP PLATFORM database communicates with the SRAP PLATFORM component, other program components, and/or the like. The database may contain, retain, and provide information regarding other nodes and data.

The SRAP PLATFORMs

The SRAP PLATFORM component 635 is a stored program component that is executed by a CPU. In one embodiment, the SRAP PLATFORM component incorporates any and/or all combinations of the aspects of the SRAP PLATFORM that was discussed in the previous figures. As such, the SRAP PLATFORM affects accessing, obtaining and the provision of information, services, transactions, and/or the like across various communications networks.

The SRAP PLATFORM component enables the secure data transmission, data storage, and/or the like and use of the SRAP PLATFORM.

The SRAP PLATFORM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SRAP PLATFORM server employs a cryptographic server to encrypt and decrypt communications. The SRAP PLATFORM component may communicate to and/or with other components in a component collection, including itself, and/or facilities of the like. Most frequently, the SRAP PLATFORM component communicates with the SRAP PLATFORM database, operating systems, other program components, and/or the like. The SRAP PLATFORM may contain, communicate, generate, obtain, and/or provide program component, system, user, and/or data communications, requests, and/or responses.

Distributed SRAP PLATFORMs

The structure and/or operation of any of the SRAP PLATFORM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SRAP PLATFORM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

APPENDIX 1A

Security Requirements vs. Payload Types

| Interfaces | Payload Types | | |
|---|---|---|---|
| | Presentation | Application | Environment |
| Shell Management - Shell should be remotely manageable to control policies it enforces | | | |
| Shell checks for policy updates whenever it is able to (online) | | R | R |
| Shell checks at a policy-defined frequency | | R | R |
| Shell validates that policies received come for correct source | | R | R |
| Shell enforces all possible policy changes as soon as possible | | R | R |
| Prompt for credential after a policy-defined amount of idle time | | R | R |
| Prompt for credential on return from sleep | | R | R |
| Prompt for credential on return from Hibernate | | R | R |
| Lock on-demand by user | | R | R |
| Shell is uniquely identifiable | | | R |
| Shell instance is tied to a User | | | R |
| Maintain accurate central inventory | | | R |
| Authentication - Access (including offline) to Shell and Payload within must be authenticated and authorized | | | |
| Shell and the contents within it can only be started if authentication and authorization is passed | R | R | R |
| Authentication is "2 factor" | R | R | R |
| Authentication against backend does not compromise critical infrastructure | R | R | R |
| Credentials follow Firm password standards | R | R | R |
| Cached credentials are stored per accepted standards | R | R | R |
| Multiple failed Authentications result in lockout for a specified time | R | R | R |
| Validation - Shell and Payload integrity should be verifiable | | | |
| Integrity of Shell can be validated | | R | R |
| Integrity of payload can be validated | | R | R |
| Payload Management - Shell should enable management and protection of the Payload it carries | | | |
| Payload update does not incur data loss | | | R |
| Payload is protected from Vulnerabilities | | | R |
| Payload is uniquely identifiable | | | R |
| Maintain accurate central inventory | | | R |
| Data Control - Data within Shell should be protected from leaving the Shell and new Data is delivered to valid Shell instances only | | | |
| Policy to prevent\allow copy\paste of text out of Shell | R | R | R |
| Policy to prevent\allow copy\paste of other clipboard data out of Shell | R | R | R |
| Policy to prevent\allow copy\paste of file out of Shell | R | R | R |
| From perspective of elements outside the Shell, data must be encrypted while in use | | R | R |
| When Shell is not in use, data it retains must be encrypted | | | R |
| Encryption must be industry-standard | | R | R |
| Encryption key protected using industry standard encryption methods | | R | R |
| Do not clear data when restarting Shell environment | | | R |
| If Payload allows it, keep data offline | | | R |
| Sync occurs post authentication | | | R |
| If Sync can occur without Corporate Connectivity (VPN), Sync stream is encrypted | | | R |
| If Sync can occur without Corporate Connectivity (VPN), Sync stream can be terminated by Administrators from back end on-demand | | | R |

APPENDIX 1A-continued

Security Requirements vs. Payload Types

| Interfaces | Payload Types | | |
|---|---|---|---|
| | Presentation | Application | Environment |
| *Peripherals - Access to Host Peripherals should not be allowed unless specifically authorized* | | | |
| Protect when connected to potentially hostile network using NAT, Firewall, and similar concepts | | R | R |
| Allow\Deny Printing Policy | R | R | R |
| Policy to prevent\allow access to host file system from within guest | R | R | R |
| Policy to prevent\allow access to guest file system from within host | R | R | R |
| Policy to prevent\allow access to host media drives from within guest | R | R | R |
| Policy to prevent/allow access to USB or like devices | R | R | R |
| *Corporate Connectivity - Connection back to corporate over which work is done and data is transacted* | | | |
| 2-factor required to establish connection back to internal Firm networks | R | R | R |
| Connection has maximum lifespan controlled by policy | R | R | R |
| Connection can be terminated on demand from either end | R | R | R |
| Connection uses industry-certified encryption (SSL, IPSec, etc.) | R | R | R |
| Encrypted channel reaches back to Shell itself | R | R | R |
| Host cannot "piggyback" on Shell connection | R | R | R |

Note:
"R" = Required

APPENDIX 1B

Usability/Manageability Requirements vs. Payload Types

| Interfaces | Payload Types | | |
|---|---|---|---|
| | Present- | Applic- | Environ- |
| *Shell Management - Shell should be remotely manageable to control policies it enforces* | | | |
| Full set of policies can be applied to AD objects | R | R | R |
| Policies can be applied to user objects | R | R | R |
| Policies can also be assigned per Shell | | | R |
| Shell checks for updates (manifest, payload, self) whenever it is able to (online) | | R | R |
| Shell checks at policy-defined frequency | | R | R |
| Delivery of updates does not rely on Data connectivity ("In-Band"), but simply on online availability ("out-of-bad") | | R | R |
| Can update Shell itself via periodic pull and on-demand | | R | R |
| Update Mechanism is non-disruptive | | R | R |
| Update resumes on reconnection to Internet | | R | R |
| Update can be delivered via media or online | | R | R |
| Updates occur "out-of-band" | | R | R |
| *Authentication - Access (including offline) to Shell and Payload within must be authenticated and authorized* | | | |
| Online authentication is checked against backend | R | R | R |
| *Payload Management - Shell should enable management and protection of the Payload it carries* | | | |
| Can update Payload via pull and on-demand | R | R | R |
| Update is non-disruptive | | R | R |

APPENDIX 1B-continued

Usability/Manageability Requirements vs. Payload Types

| Interfaces | Payload Types | | |
|---|---|---|---|
| | Present- | Applic- | Environ- |
| Payload Update resumes on reconnection to Internet | | R | R |
| Payload update can be delivered via media or online | R | R | R |
| Payload update doe not incur data loss | R | R | R |
| Updates occur "out-of-band" | | | R |
| *Data Control - Data within Shell should be protected from leaving the Shell and new Data is delivered to valid Shell instances only* | | | |
| Policy to prevent\allow copy\paste of into Shell | R | R | R |
| Allow within-Shell copy\paste | R | R | R |
| Logically separate Data from the rest of the Payload | R | R | R |
| Do not clear data when restarting Shell environment | R | R | R |
| If Payload supports it, keep data offline | | | R |
| Shell\Payload should be self-sufficient in handling synching and offline data | | | R |
| *Peripherals - Access to Host Peripherals should not be allowed unless specifically authorized* | | | |
| Be able to operate without requiring own "public": IP | R | R | R |
| Policy allowing\preventing separate but simultaneous use of host network while Shell runs | R | R | R |
| Automatically reconnect to network when it becomes available (switch from online to offline) | | | R |
| Adapter independence. Can ride own connection over any adapter host is using | R | R | R |
| Policy allowing\preventing separate but simultaneous display of host desktop\application while Shell runs | R | R | R |
| Policy allowing\preventing separate but simultaneous interaction with host desktop\application while Shell runs | R | R | R |
| Allow\Deny Printing Policy | R | R | R |
| *Corporate Connectivity - Connection back to corporate over which work is done and data is transacted* | | | |
| Shell remains usable even without data connectivity | | | R |
| Shell does not preclude a host from retaining its own connection to Internet | R | R | R |

Note:
"R" = Required

APPENDIX 2A

Shell Management Specifications

The following requirement classifications are used throughout Appendices 2A-2F:

Required (R)—These are features that must be part of any solution, otherwise the solution cannot be considered further. Note: these specifications were written with the "Environment" Payload Type in mind as it is the most elaborate. The prior table already breaks down the subset of these "Required" specifications that apply to each Payload Type.

Enhanced Control with Strong Bias (EC*)—These are further security or management controls that although may not be required at first are deemed highly desirable and a noted enhancement to the solution. A solution will be considered without them, but failure to introduce these controls at later, near term, product revisions could lead us to consider discontinuing use.

Enhanced Control (EC)—Security or management controls that add further value to the solution and expected in medium-term roadmap.

Usability Enhancement with Strong Bias (UE*)—These are enhancements to the use experience that make the product more flexible, transparent, and valuable. A solution may be considered without implementation of all these, but failure to introduce them at later product revisions could lead us to consider discontinuing use.

Usability Enhancement (UE)—Enhancements to the use experience that make the product more flexible, transparent, and valuable. They would be expected in medium-term roadmap.

| # | Specifications | Driver | Type | Reason\Notes\Examples | Black-Berry | Laptop | Reference |
|---|---|---|---|---|---|---|---|
| | | | | Fine-grained Management | | | |
| 1 | Full set of policies can be applied to AD objects | Manageability | R | This is for management and usability, but as long as can auth against a given set, there's no security requirement that it has to be AD. This is more of a usability\manageability requirement | Y | Y | Refer to Control Plane Flows |
| 2 | Policies can be applied to user objects | Manageability | R | Most policies should follow the user rather than the "machine". On corporate Laptops, most, if not all, policies are on the machine rather than the user | Y | N | Refer to Control Plane Flows |
| 3 | Policies can also be assigned per Shell | Manageability | R | Some policies, like inventory control, may apply better to Shell than to user. Also, for example, would allow admin to de-provision a certain Shell instance for a user that has multiple Shells without de-provisioning the user | N | Y | Refer to Control Plane Flows |
| 4 | Location Awareness | Manageability | EC | Shell should be location aware (for example, whether it is inside corporate network or on the Internet) so that location-specific policies can be implemented | N | N | Refer to User Plane Flows |
| | | | | Policy Changes Check | | | |
| 5 | Shell checks for updates (manifest, payload, self) whenever it is able to (online) | Manageability | R | A consistent and reliable policy update is what allows for trust that policy updates are being enforced. Otherwise how would a "destroy" command or important data\leakage policy change be implemented | Y | Y | Refer to User Plane Flows |
| 6 | Shell checks at a policy-defined frequency | Manageability | R | See above | Y | Y | Manifest - Appendix C |
| 7 | Shell validates that policies received come for correct source | Security | R | Otherwise how does Shell know the received policies are not spoofed? Can be implemented by the manifest provider signing the policy file. The apparent discrepancy with Laptop is resolved by fact that currently corporate Laptop can only receive polices via a 2-factor authenticated VPN channel, so policies themselves need not be signed. If patching-over-internet is implemented, this would be required on Laptops as well | Y | N | Refer to User Plane Flows |
| 8 | Shell enforces all possible policy changes as soon as possible | Security | R | See above | Y | Y | Refer to User Plane Flows |
| 9 | Delivery of updates does not rely on Data connectivity ("In-Band"), but simply on online availability ("out-of-bad") | Manageability | R | This allows for policy changes "out-of-band" even when user is not actively VPN'd in and doing work. Note that corporate Laptop can only do this when a Data connection (a VPN) is in place. Solution should accomplish by simply being online and authenticated, even if no VPN exists to transmit data | NA | N | Refer to Transfer Plane Flows |
| | | | | Shell Expiration Date | | | |
| 10 | Option to lock Shell after expiration | Security | EC* | Protect against former employees, stolen asset | N | N | Manifest - Appendix C |
| 11 | Can unlock Shell only when authenticating online | Security | EC* | | N | N | Manifest - Appendix C |
| 12 | Option to destroy bubble and\or payload after expiration | Security | EC | In a Type II implementation, that would be destroying the VM | N | N | Manifest - Appendix C |
| 13 | Option to destroy Shell itself after expiration | Security | EC* | In a Type Ii implementation, that would be destroying the client that manages the VM | N | N | Manifest - Appendix C |
| 14 | Can extend expiration date | Security | EC | | N | N | Manifest - Appendix C |
| | | | | Allow offline access for limited period | | | |
| 15 | Option to lock Shell after expiration | Security | EC* | Protect against former employees, stolen asset | Y | N | Manifest - Appendix C |

-continued

| # | Specifications | Driver | Type | Reason\Notes\Examples | Black-Berry | Laptop | Reference |
|---|---|---|---|---|---|---|---|
| 16 | Can unlock Shell only when authenticating online | Security | EC* | | Y | N | Manifest - Appendix C |
| 17 | Option to destroy bubble or payload after expiration | Security | EC | In a Type II implementation, that would be destroying the VM | Y | N | Manifest - Appendix C |
| 18 | Option to destroy Shell itself after expiration | Security | EC* | In a Type II implementation, that would be destroying the client that manages the VM | N | N | Manifest - Appendix C |
| 19 | Can unlock Shell offline via a challenge\response mechanism | Security | EC | Accommodates user that may have needed to have personal asset offline for a while | N | Y | Manifest - Appendix C |
| | | | | On-Demand Revocation | | | |
| 20 | Shell can be locked by administrator for given: User User Group Host | Security | EC* | Protect against former employees, stolen asset | Y | N | Manifest - Appendix C |
| 21 | Bubble\Payload can be destroyed by Administrator for given user\user group\host User User Group Host | Security | EC* | In a Type II implementation, that would be destroying the VM | Y | N | Manifest - Appendix C |
| 22 | Shell itself can be destroyed by Administrator for given user\user group\host User User Group Host | Security | EC | In a Type II implementation, that would be destroying the client that manages the VM | N | N | Manifest - Appendix C |
| | | | | "Idle\Time" Locking | | | |
| 23 | After a policy-defined amount of idle time | Security | R | Similar to screensaver lock | Y | Y | Manifest - Appendix C |
| 24 | On return from sleep | Security | R | | Y | Y | Manifest - Appendix C |
| 25 | On return from Hibernate | Security | R | | Y | Y | Manifest - Appendix C |
| 26 | On-demand by user | Security | R | | Y | Y | Manifest - Appendix C |
| 27 | Shell should remain operational after sleep\hibernate. Only unlock required | Security | UE* | | Y | Y | Property of the Solution |
| | | | | Remote Kill | | | |
| 28 | Can initiate by Admin | Security | EC* | Protect against former employees, stolen asset. High Bias for this. Only reason is not R is because of 2-factor requirement listed in Authentication and $2^{nd}$ factor can be revoked | Y | N | Manifest - Appendix C |
| 29 | Can initiate by User (if admin permits) | Security | UE | For example, user feels asset is at risk | N | N | Manifest - Appendix C |
| 30 | Industry standard Destruction of Shell contents (payload\bubble) | Security | EC* | Destruction of corporate data and applications via approved cryptographic shredding. For example, re-encrypt with random key and loose the key | Y | N | Property of the Solution |
| 31 | Destruction of Shell itself | Security | EC | Destruction of Shell so it cannot be exploited to re-obtain any payload | N | N | Property of the Solution |
| | Shell Updatability (For example: update hypervisor and managing client, or update the policies client applies to hypervisor) | | | | | | |
| 32 | Can update Shell policies via periodic pull and on-demand | Manageability\Usability | R | Pull scales better and also lends itself to this environment where targets are intermittently offline | N | Y | Manifest - Appendix C |
| 33 | Can update Shell itself via periodic pull and on-demand | Manageability\Usability | R | Pull scales better and also lends itself to this environment where targets are intermittently offline | N | N | Manifest - Appendix C |
| 34 | Update mechanism is non-disruptive: User can continue to use "old" Shell while download of update occurs when ready to update, user can defer until ready Capability for user to defer is a policy controlled option | Manageability\Usability | R | Very Highly desired - A usability requirement. Reason Laptops are not liked | Y | N | Manifest - Appendix C |
| 35 | Shell update resumes on reconnection to Internet | Manageability\Usability | R | Very Highly desired - maybe a usability requirement. Reason Laptops are not liked | Y | N | Manifest - Appendix C |

-continued

| # | Specifications | Driver | Type | Reason\Notes\Examples | Black-Berry | Laptop | Reference |
|---|---|---|---|---|---|---|---|
| 36 | Shell and updates can be delivered via media or online | Manageability\Usability | R | Very Highly desired - maybe a usability requirement. Reason Laptops are not liked | N | Y | Refer to Transfer Plane Flows |
| 37 | Shell update occurs "out-of-band" | Manageability\Usability | R | Download of Shell update can occur even when no VPN is present, as long as Shell has an online connection to Shell update repository on control plane. This way updates don't only happen when users want to do work | Y | N | Refer to Transfer Plane Flows |
| 38 | Minimum Shell version can be required for operation | Security | EC | So no longer allow Shell version that are vulnerable to known exploit and have been patched in newer version | N | N | Manifest - Appendix C |
| | | | | Inventory | | | |
| 39 | Shell is uniquely identifiable | Security\Manageability | R | So can apply policies to individual Shells and keep count | Y | Y | Refer to Control Plane Flows |
| 40 | Shell instance is tied to a User | Security\Manageability | R | Allows for inventory tracking, billing, and accountability | Y | Y | Refer to Control Plane Flows |
| 41 | Maintain accurate central inventory | Security\Manageability | R | Control Shell spread to too many hosts (like hotels, etc) | Y | Y | Refer to Control Plane Flows |
| 42 | Limit maximum deployed Shells | Security\Manageability | EC | Licensing control | N | N | Refer to Control Plane Flows |
| 43 | Limit Shells per user | Security\Manageability | EC | Control Shell spread to too many hosts (like hotels, etc) | N | N | Refer to Control Plane Flows |
| | | | | Resource Allocation | | | |
| 44 | Provide policy to limit resources Shell takes from host | Usability | UE | Prevents unusable state where host is starved for resources. Limits bubble to just what it needs | NA | NA | Manifest - Appendix C |

APPENDIX 2B

Authentication Specifications

| # | Specifications | Driver | Type | Reasons\Notes\Examples | BlackBerry | Laptop |
|---|---|---|---|---|---|---|
| 1 | Shell and the contents within it can only be started if authentication and authorization is passed | Security | R | Access only for authenticated users who are authorized to manipulate data | Y | Y |
| 2 | Authentication is "2 factor" | Security | R | 2 factor in the sense of a separate "something you know and something you have". An example implementation could be requiring a USB token to be inserted on host machine as well as user password.<br>BlackBerry and corporate Laptop accomplish this 2nd factor by being non-transferable physical devices in themselves. User has the corporate device and the password. They are separate and user cannot access Shell without both. With something like a Type II bubble, since the bubble may be transferable to any host HW, the 2nd factor may have to be "externalized" (i.e. to USB). Type I solutions may resolve this since they overtake the HW, in a sense making it more analogous to corporate Laptop. Also, implementation of attestation against TPM could constitute this 2nd factor. Finally, the $2^{nd}$ factor can also be accomplished via more traditional means as well such as RSA SecurID. | Y | Y |
| 3 | Online authentication is checked against backend | Manageability | R | For the purposes of ascertaining entitlement and relevant policies and updates. Not strictly a non-negotiable security requirement if both 2-factor authentication (above) and Remote Kill (see Shell Management) capabilities are implemented (thus matching BlackBerry)., but would be required for Usability\Management Enhancement. If Remote Kill is not implemented, this would then become a security Requirement as well.<br>BlackBerry never checks password against | N | Y |

APPENDIX 2B-continued

Authentication Specifications

| # | Specifications | Driver | Type | Reasons\Notes\Examples | BlackBerry | Laptop |
|---|---|---|---|---|---|---|
| 4 | Authentication against backend does not compromise critical infrastructure | Security | R | anything else than local cache. In theory that means that a stolen blackberry could be hacked to change local-cached password and thus access be gained - but apparently this has never been successfully done. Use Radius, Kerberos, PKI. For example, if authentication is NTLM, it cannot be directed against AD without a prior check since this could result in DoS attacks by locking out accounts. Also, input should be pre-validated at DMZ preventing mal-formatted data attack | NA | Y |
| 5 | Credentials follow Firm password standards | Security | R | Such as complexity, non-use of previous passwords, etc | Y | Y |
| 6 | Cross-Realm Trust and Authentication is Supported | Manageability | EC* | Self Explanatory | Y | Y |
| 7 | Cached credentials are stored per accepted standards | Security | R | For example, use entered credentials to gen a key that decrypts master key. | Y | Y |
| 8 | Credentials validation attempts proceed in order. Attempt online first, then offline against cached credentials | Manageability | EC* with Dependency (see Notes) | See note on "Online Authentication is checked against backend" | NA | Y |
| 9 | Offline authentication is revalidated when Shell finds itself online again | Manageability | EC with Dependency (see Notes) | Prevents circumvention of controls by, for example, always logging on offline. See note on "Online Authentication is checked against backend" | NA | N |
| 10 | Multiple failed Authentications result in lockout for a specified time | Security | R | | Y | Y |
| 11 | Number of failed attempts and duration of lockout dictated by policy | Security | EC | As in "3 failed attempts in a row locks for 30 min" | Y | Y |
| 12 | Repeated lockout are reported | Manageability | EC | | N | N |
| 13 | Shell has capability to allow user to change password | Usability | EC | Lets user change password when it is about to expire | Y | Y |
| 14 | Shell has capability to demand a password change | Usability | EC* | For example, online authentication reveals that password has expired | Y | Y |
| 15 | Offline password change mechanism for forgotten password | Usability | UE | If user has forgotten password and is offline. Challenge\Response mechanism is an example | N | Y |
| 16 | Capabilities above can be disabled | Manageability | EC | | Y | Y |
| 17 | Credentials are passed to applications that require them | Usability | EC* | | N | Y |
| 18 | Application can "run as" the authenticated user | Usability | EC* | Even if Shell or payload is not running with user context and only uses the credentials provided to authenticate and authorize, option should be available for apps to "run as" the user (using their network token, for example), otherwise this will result in multiple authentications being demanded from the user | N | Y |

APPENDIX 2C

Validation Specifications

| # | Specifications | Driver | Type | Reason\Notes\Examples | BlackBerry | Laptop |
|---|---|---|---|---|---|---|
| 1 | Application white list that is validated against the manifest | Security | EC | Ensures that nothing else can run in Shell. This may be implemented in Payload itself - particularly if payload is an OS, like by Type I\II implementations. Can use SRP to accomplish this | Y | N |
| 2 | Exception mechanism for helpdesk\administrators is provided | Manageability | EC | | Y | N |
| 3 | User entitlements (Apps, data, peripherals, etc.) are | Security | EC* | Checking Authorization provided by Control Plane | Y | N |

APPENDIX 2C-continued

| | Validation Specifications | | | | | |
|---|---|---|---|---|---|---|
| # | Specifications | Driver | Type | Reason\Notes\Examples | BlackBerry | Laptop |
| | validated against manifest prior to access | | | | | |
| 4 | Shell control policies changes can be re-checked and validated on demand and at intervals | Security | EC | Distinctive from Policy check and Enforcement R listed in Shell Management section. This is an added control for on-demand "audit" that current policies are still being enforced | N | N |
| 5 | Integrity of Shell can be validated | Security | R | I.e. Ensure that is using current version of HV or controlling client. NA on Laptop and Blackberry because Shell is HW and not such high concern in validating HW integrity from a security standpoint | NA | NA |
| 6 | Integrity of payload can be validated | Security | R | i.e. Endpoint analysis like CGK (could use CGK in Type I and II implementations) | Y | Y |
| 7 | Integrity of policies can be validated | Security | EC* | Signed policies and settings | Y | N |
| 8 | Can validate Host that it will run on | Manageability | EC | Validate that this is an OK host to run on prior to actually starting the payload | NA | NA |

APPENDIX 2D

| | Payload Management Specifications | | | | | |
|---|---|---|---|---|---|---|
| # | Specifications | Driver | Type | Reason\Notes\Examples | BlackBerry | Laptop |
| 1 | Can update via pull and on-demand | Manageability\Usability | R | Pull scales better and also lends itself to this environment where targets are intermittently offline | N | Y |
| 2 | Update mechanism is non-disruptive: User can continue to use "old" payload while download of update occurs When ready to update, user can defer until ready "old" payloads can be destroyed as per policy (destruction is industry standard) How far back a payload is defined as old is controlled as policy (i.e. delete all but current and previous) | Manageability\Usability | R | Very Highly desired - a usability requirement. Reason Laptops are not liked | Y | N |
| 3 | Payload update resumes on reconnection to Internet | Manageability\Usability | R | Very Highly desired - a usability requirement. Reason Laptops are not liked | Y | N |
| 4 | Payload update can be delivered via media or online | Manageability\Usability | R | Very Highly desired - a usability requirement. Reason Laptops are not liked | N | Y |
| 5 | Payload update does not incur data loss | Usability | R | Data files should persist even with payload, such as OS or apps, is updated. Otherwise important work is lost | Y | Y |
| 6 | Update occurs "out-of-band" | Manageability\Usability | R | Download of payload update can occur even when no VPN is present, as long as Shell has an online connection to update repository on control plane and it has authenticated and is authorized. This way updates don't happen only when users want to do work | Y | N |
| 7 | Can revert to a previous version of the payload | Usability | UE | Useful if found that a payload update has caused issues and user wants to roll back. Laptops have System Restore, but VM implementations can let you restore fully to the previous version of image | N | To some degree |
| 8 | Can set via policy how far back user can revert | Manageability | UE | Useful if found that a payload update has caused issues and user wants to roll back | N | N |
| 9 | Minimum payload version can be required for operation | Security\Manageability | EC | So no longer allow payload version that are vulnerable to known exploit and have been patched in newer version | N | N |
| 10 | Payload is protected from Vulnerabilities | Security | R | Protect from infection host could pass or that can be downloaded unto payload. Implement via , for example, Reversibility and\or possibly HIPS, AV, Sandboxing, BOP, etc. If the Shell itself does not provide this control, it could in theory be implemented on the payload itself. If, for example, the payload is an OS | N | Y |

APPENDIX 2D-continued

Payload Management Specifications

| # | Specifications | Driver | Type | Reason\Notes\Examples | BlackBerry | Laptop |
|---|---|---|---|---|---|---|
| | | | | (Type I/II implementation), same protection client used on Laptop can be used there. | | |
| 11 | Payload is uniquely identifiable | Security\Manageability | R | For example, each payload OS has own name | Y | Y |
| 12 | Maintain accurate central inventory | Manageability | R | Control Shell spread to too many hosts (like hotels, etc) | Y | Y |

APPENDIX 2E

Data Control Specifications

| # | Specifications | Driver | Type | Reason\Notes\Examples | BlackBerry | Laptop |
|---|---|---|---|---|---|---|
| 1 | Policy to prevent\allow copy\paste of text into Shell | Security | R | For example, allow pasting of plain-text from host to guest | NA | NA |
| 2 | Policy to prevent\allow copy\paste of other clipboard data into Shell | Security | EC* | May want to allow paste-in of text but not other elements (like images) | NA | NA |
| 3 | Policy to prevent\allow copy\paste of file into Shell | Security | EC* | May want to allow paste-in of clipboard but not files | NA | NA |
| 4 | Policy to prevent\allow copy\paste of text out of Shell | Security | R | Prevent Data Leakage | NA | NA |
| 5 | Policy to prevent\allow copy\paste of other clipboard data out of Shell | Security | R | Prevent Data Leakage | NA | NA |
| 6 | Policy to prevent\allow copy\paste of file out of Shell | Security | R | Prevent Data Leakage | NA | NA |
| 7 | Allow within-Shell copy\paste | Usability | R | Even if all above policies are set to no-allow, still allow elements (apps) within the Shell to share data undisturbed | Y | Y |
| 8 | Audit\Record if access is allowed | Security | EC | Self Explanatory | N | N |
| 9 | From perspective of elements outside the Shell, user data must be encrypted while in use | Security | R | Prevent data loss | Y | Y |
| 10 | When Shell is not in use, user data it retains must be encrypted | Security | R | Prevent data loss | Y | Y |
| 11 | Encryption must be industry-standard | Security | R | Self Explanatory - (AES 128 minimum, AES 256 preferred) | Y | Y |
| 12 | Encryption supports added access types | Manageability | EC | For example, Help Desk, Regulators, etc. can decrypt with master\sub-master keys when needed | N | Y |
| 13 | Encryption key can be updated periodically | Security | EC | All encryption loses its protective value over time. Re-encrypting with a different key periodically extends the protection | N | N |
| 14 | Encryption key protected using industry standard encryption methods | Security | R | Prevent offline use of encryption keys or offline cracking of key/ stores. | Y | Y |
| 15 | Encryption does not noticeably affect performance | Usability | UE | Self Explanatory | N | N |
| 16 | Logically separate Data from the rest of the Payload | Manageability\Usability | R | User Data is worked on by the Payload but is not part of the Payload. Hence it is not updated during a Payload update or if Shell reverts to using an older cached Payload version. Data is only brought into the Shell via a separate synching mechanism likely to first be implemented over an "in-band" connection such as VPN. We would desire for e-mail data in particular that eventually the Shell could receive such data even over the "out-of-band" channel | Y | Y |
| 17 | Do not clear data when restarting Shell environment | Usability | R | Otherwise documents kept offline will not be there or user will be forced to keep Shell up indefinitely. | Y | Y |
| 18 | If Payload allows it, keep data offline | Usability | R | Self Explanatory | Y | Y |
| 19 | Sync occurs post authentication | Security | R | Sync of data will only occur to identified and active Shells/ users | Y | Y |
| 20 | Sync can be manually started | Usability | UE | Would like better experience that what have on laptop, more like blackberry | Y | Y |

APPENDIX 2E-continued

Data Control Specifications

| # | Specifications | Driver | Type | Reason\Notes\Examples | BlackBerry | Laptop |
|---|---|---|---|---|---|---|
| 21 | Sync can be automated | Usability | UE | Would like better experience that what have on laptop, more like blackberry | Y | Y |
| 22 | Sync can occur even if no Corporate connection (VPN) exists | Usability | UE | As long as Internet connectivity exists. - i.e. through DMZ. Similar to blackberry in that certain kinds of Data, such as e-mail, can be transmitted "out of band" as long as Shell has internet access. BlackBerry only currently has this capability. Would desire such capability for e-mail on new Shell products | Y | N |
| 23 | If Sync can occur without Corporate Connectivity (VPN), Sync stream is encrypted | Security | R (NA if above UE is not implemented) | If such "sync outside VPN" is implemented, ensure it includes authentication, authorization, integrity and confidentiality | Y | NA |
| 24 | If Sync can occur without Corporate Connectivity (VPN), Sync stream can be terminated by Administrators from back end on-demand | Security | R (NA if above UE is not implemented) | If such "sync outside VPN" is implemented, ensure it includes authentication, authorization, integrity and confidentiality | Y | NA |
| 25 | Shell\payload should be self sufficient in handling synching and offline data | Usability | R | For example, an Shell app developed for a platform should be able to handle offline itself without necessarily expecting assistance from backend infrastructure | N | Y |

APPENDIX 2F

Data Control Specifications

| # | Specifications | Driver | Type | Reason\Notes\Examples | BlackBerry | Laptop |
|---|---|---|---|---|---|---|
| 1 | Protect when connected to potentially hostile network using NAT, Firewall, and similar concepts | Security | R | Prevent infection from Internet or unknown networks. Would prefer implementation at the Shell so it can be managed via manifest policy, but could be implemented on Payload as well in Type I and II implementations | Y | Y |
| 2 | Be able to operate without requiring own "public" IP | Usability | R | Can operate on Hotel or EvDO situation where host has the one IP | NA | NA |
| 3 | Grant access to sites based on blacklist and white list | Security | EC | Prevent access to disallowed sites if Shell will allow internet access. Blackberries only allow web traffic through our proxies, while corporate Laptops on Internet (w\o VPN) can go anywhere | Y | N |
| 4 | Policy allowing\preventing separate but simultaneous use of host network while Shell runs | Usability | R | Allows user to continue using personal asset as they desire - drives acceptance of solution | N | N |
| 5 | Automatically reconnect to network when it becomes available (switch from offline to online) | Usability | R | Allows consistency of work | Y | N |
| 6 | Adapter independent. Can ride own connection over any adapter host is using | Usability | R | Allows consistency of work | NA | NA |
| 7 | Allow to display in all resolutions and screen sizes | Usability | UE* | Support client HW diversity | NA | NA |
| 8 | Allow use of multiple monitors | Usability | UE* | Self Explanatory | N | Y |
| 9 | Multilanguage support | Usability | UE* | Self Explanatory | Y | Y |
| 10 | Support for international and alternate keyboard layouts | Usability | UE* | Self Explanatory | Y | Y |
| 11 | Provide policy blocking pass-through of audio | Usability | UE | Self Explanatory | N | N |
| 12 | Policy allowing\preventing separate but simultaneous display of host desktop\application while Shell runs | Usability | R | Allows user to continue using personal asset as they desire - drives acceptance of solution | N | N |
| 13 | Policy allowing\preventing separate but simultaneous interaction with host | Usability | R | Allows user to continue using personal asset as they desire - drives acceptance of solution | N | N |

APPENDIX 2F-continued

Data Control Specifications

| # | Specifications | Driver | Type | Reason\Notes\Examples | BlackBerry | Laptop |
|---|---|---|---|---|---|---|
| | desktop\application while Shell runs | | | | | |
| 14 | Shell prevents key logging by host | Security | EC | Prevent Data Leakage and Compromise of credentials | N | N |
| 15 | Shell prevents screen scrapping by host | Security | EC | Prevent Data Leakage | N | N |
| 16 | Allow\Deny Printing Policy | Security\Usability | R | Prevent Data Leakage | Y | Y |
| 17 | If printing is allowed, allow printing to predetermined or all printing devices (i.e. allow to real printers but not to print-to-file) | Security | EC | Prevent Data Leakage | N | N |
| 18 | Leverage best available driver | Usability | UE | Self Explanatory | N | Y |
| 19 | Audit\Record print job | Manageability | EC | Self Explanatory | N | N |
| 20 | Policy to prevent\allow access to host file system from within guest | Security | R | Prevent Data Leakage | NA | NA |
| 21 | Policy to prevent\allow access to guest file system from within host | Security | R | Prevent Data Leakage | NA | NA |
| 22 | Audit\Record if access is allowed | Manageability | EC | Self Explanatory | N | N |
| 23 | Policy to prevent\allow access to host media drives from within guest | Security | R | Prevent Data Leakage. BlackBerry device does not support such HW | NA | N |
| 24 | Audit\Record if access is allowed | Manageability | EC | Self Explanatory | N | N |
| 25 | Policy to prevent/allow access to USB or like devices | Security | R | Prevent Data Leakage | Y | Y |
| 26 | Discriminate between types of devices and provide policy for each type (i.e. different policies for mass-storage USB vs. USB headset) | Security | EC | Prevent Data Leakage. Prefer done at the Shell, but can also have in payload - Device Lock. BlackBerry blocks all. corporate Laptop has high-level discrimination via Device Lock. | N | Y |
| 27 | Audit\Record if access is allowed | Manageability | EC | Self Explanatory | N | N |
| 28 | Serve as single point of entry into Shell (i.e. control bypass via direct memory access etc) | Security | EC | Prevent memory injection attacks | NA | NA |

APPENDIX 2G

Corporate Connectivity Specifications

| # | Specifications | Driver | Type | Reason\Notes\Examples | BlackBerry | Laptop |
|---|---|---|---|---|---|---|
| 1 | 2-factor required to establish connection back to internal Firm networks | Security | R | Otherwise have weak protection of internal network and data residing there. Examples are RSA SecurID like Laptop VPN or Access. corporate SSL and user\machine\client certificates. Other example is device itself being the 2nd factor, possibly externalizing it to something like a USB token. See Authentication section for longer discussion of this topic | Y | Y |
| 2 | Connection has maximum lifespan controlled at the Transfer or Control Planes | Security | R | Policy may be defined in the control plane rather than at Shell. BlackBerry is exempted here because it does not come over the Internet as most other bubble solution probably would. Rather it comes over a highly trusted NOC infrastructure. Hence the allowance for no maximum connection lifespan | N | Y |
| 3 | Connection can be terminated on demand from either end | Security | R | User can terminate connection to corporate on command, and corporate can terminate connection at any time as well | Y | Y |
| 4 | Connection uses industry-certified encryption (SSL, IPSec, etc.) | Security | R | Protecting corporate data in transit | Y | Y |
| 5 | Encrypted channel reaches back to Shell itself | Security | R | Prevent Data Leakage | Y | Y |

APPENDIX 2G-continued

Corporate Connectivity Specifications

| # | Specifications | Driver | Type | Reason\Notes\Examples | BlackBerry | Laptop |
|---|---|---|---|---|---|---|
| 6 | Host cannot "piggyback" on Shell connection | Security | R | Prevent Infection of corporate and Data Leakage | NA | NA |
| 7 | Shell does not preclude a host from retaining its own connection to Internet | Usability | R | So user can still use host for personal use and Shell for work, or connection to work, simultaneously without risk of mixing | NA | NA |
| 8 | Shell remains usable even without data connectivity | Usability | R | To run Shell, protected connection back to corporate is not requisite. Of course, some functionality may not be available, but can do whatever possible offline and Shell will be running and ready to reconnect to corporate at any time - Not a security requirement, but high bias for this | Y | Y |

What is claimed is:

1. A multi-layered processor-implemented method for secure access to corporate resources, comprising:
   receiving a Payload specific request to access a plurality of corporate resources from at least one user;
   initializing via a processor a uniquely identified Shell based on the received request, wherein the Shell comprises a plurality of Payload backups;
   receiving a set of user authentication credentials from the user;
   sending the set of user authentication credentials to a corporate server controlling the corporate resources;
   receiving an authentication decision from the corporate server; and
   if the authentication decision is affirmative,
      establishing a secure connection between the Shell and the corporate server,
      receiving a plurality of control policies from the corporate server via the secure connection, and
      accessing the plurality of corporate resources via the established secure connection in compliance with the received control policies.

2. The method of claim 1, wherein the uniquely identified Shell comprises at least the Payload and a Bubble.

3. The method of claim 2, wherein the Shell instantiates at least one of:
   a partition without hypervisors;
   hardware virtualization with bare metal hypervisors;
   hardware virtualization with hypervisors on top of a host operating system;
   operating system virtualization with application containers;
   directly hardened special purpose applications; and
   user session virtualization.

4. The method of claim 1, wherein the Shell comprises a plurality of Shell interfaces.

5. The method of claim 4, wherein the plurality of Shell interfaces are controlled by the Shell and collectively provide a controlled point of entry into the Payload.

6. The method of claim 5, wherein the plurality of Shell interfaces comprises components for authentication, validation, Payload management, data control, peripherals, corporate connectivity and Shell management.

7. The method of claim 1, wherein the Payload is at least one of an Environment type, an Application type, and a Presentation type.

8. The method of claim 7, wherein the Payload synchronizes data with a Shell interface if the Payload is of the Environment type.

9. The method of claim 1, wherein the Shell further comprises a plurality of cached user authentication credentials.

10. The method of claim 1, wherein the Shell further comprises a plurality of cached control policies.

11. The method of claim 1, wherein the user authentication credentials are multi-factor authentication credentials.

12. The method of claim 1, wherein sending the set of user authentication credentials to a corporate server comprises:
   sending the set of user authentication credentials to a Transfer Plane entity,
      wherein the Transfer Plane entity relays the set of user authentication credentials to the corporate server.

13. The method of claim 1 further comprising blocking the request to access the plurality of corporate resources if the user is denied access to corporate resources based on the received authentication decision.

14. The method of claim 1, wherein the established secure connection comprises at least one In-Band channel and at least one Out-of-Band channel.

15. The method of claim 1, wherein the established secure connection to the corporate server has a relay point at a Transfer Plane entity.

16. The method of claim 1, wherein receiving the plurality of control policies from the corporate server comprises:
   receiving the plurality of control policies forwarded by a Transfer Plane entity from the corporate server.

17. The method of claim 1, wherein the plurality of control policies are received in the form of a plurality of Manifests by the uniquely identified Shell.

18. The method of claim 1, wherein the plurality of control policies are specific to the uniquely identified Shell.

19. The method of claim 1, wherein the plurality of control policies are received via an Out-of-Band channel of the secure connection.

20. The method of claim 1, wherein receiving the plurality of control policies comprises monitoring and downloading updates by the Shell from a Transfer Plane entity via an Out-of-Band channel.

21. The method of claim 20, wherein the updates comprise control policy updates, Shell updates and Payload updates.

22. The method of claim 1, further comprising the Shell validating and enforcing the received control policies.

23. The method of claim 22, wherein the validation and enforcement comprises:
   prompting the user to restart the Shell if required.

24. The method of claim 1, wherein accessing the plurality of corporate resources in accordance with the Payload based on the received plurality of control policies via the established secure connection further comprises:
  identifying a user-requested use of the Payload;
  making the Payload available via the Shell;
  executing the Payload based on the received plurality of control policies; and
  receiving user data from the corporate server via an In-Band channel of the secure connection.

25. The method of claim 24, further comprises terminating the Payload if the user-requested use of the Payload is accomplished.

26. The method of claim 24, wherein the received user data is forwarded by a Transfer Plane entity from the corporate server.

27. The method of claim 1, further comprises:
  receiving a request to close the uniquely identified Shell from the user; and
  terminating the uniquely identified Shell.

28. A multi-layered corporate resources secure access system, comprising:
  a memory;
  a processor disposed in communication with said memory, and configured to Issue a plurality of processing instructions stored in the memory, wherein the processor issues instructions to:
  receiving a Payload specific request to access a plurality of corporate resources from at least one user;
  initializing a uniquely identified Shell based on the received request, wherein the uniquely identified Shell comprises at least the Payload and a Bubble;
  receiving a set of user authentication credentials from the user;
  sending the set of user authentication credentials to a corporate server controlling the corporate resources;
  receiving an authentication decision from the corporate server; and
  if the authentication decision is affirmative,
    establishing a secure connection between the Shell and the corporate server,
    receiving a plurality of control policies from the corporate server via the secure connection, and
    accessing the plurality of corporate resources via the established secure connection in compliance with the received control policies.

29. The method of claim 28, wherein the Shell further comprises a plurality of Payload backups.

30. A multi-layered processor-implemented method for secure access to corporate resources, comprising:
  receiving a Payload specific request to access a plurality of corporate resources from at least one user;
  initializing via a processor a uniquely identified Shell based on the received request;
  receiving a set of user authentication credentials from the user;
  sending the set of user authentication credentials to a corporate server controlling the corporate resources;
  receiving an authentication decision from the corporate server; and
  if the authentication decision is affirmative,
    establishing a secure connection between the Shell and the corporate server, wherein the established secure connection comprises at least one In-Band channel and at least one Out-of-Band channel,
    receiving a plurality of control policies from the corporate server via the secure connection, and
    accessing the plurality of corporate resources via the established secure connection in compliance with the received control policies.

31. A multi-layered processor-implemented method for secure access to corporate resources, comprising:
  receiving a Payload specific request to access a plurality of corporate resources from at least one user;
  initializing via a processor a uniquely identified Shell based on the received request;
  receiving a set of user authentication credentials from the user;
  sending the set of user authentication credentials to a corporate server controlling the corporate resources;
  receiving an authentication decision from the corporate server; and
  if the authentication decision is affirmative,
    establishing a secure connection between the Shell and the corporate server, wherein the established secure connection to the corporate server has a relay point at a Transfer Plane entity,
    receiving a plurality of contra policies from the corporate server via the secure connection, and
    accessing the plurality of corporate resources via the established secure connection in compliance with the received control policies.

32. A multi-layered processor-implemented method for secure access to corporate resources, comprising:
  receiving a Payload specific request to access a plurality of corporate resources from at least one user;
  initializing via a processor a uniquely identified Shell based on the received request;
  receiving a set of user authentication credentials from the user;
  sending the set of user authentication credentials to a corporate server controlling the corporate resources;
  receiving an authentication decision from the corporate server; and
  if the authentication decision is affirmative,
    establishing a secure connection between the Shell and the corporate server,
    receiving a plurality of control policies from the corporate server via the secure connection, wherein the plurality of control policies are received in the form of a plurality of Manifests by the uniquely identified Shell, and
    accessing the plurality of corporate resources via the established secure connection in compliance with the received control policies.

33. A multi-layered processor-implemented method for secure access to corporate resources, comprising:
  receiving a Payload specific request to access a plurality of corporate resources from at least one user;
  initializing via a processor a uniquely identified Shell based on the received request;
  receiving a set of user authentication credentials from the user;
  sending the set of user authentication credentials to a corporate server controlling the corporate resources;
  receiving an authentication decision from the corporate server; and
  if the authentication decision is affirmative,
    establishing a secure connection between the Shell and the corporate server,
    receiving a plurality of control policies from the corporate server via an Out-of-Band channel of the secure connection, and accessing the plurality of corporate resources via the established secure connection in compliance with the received control policies.

34. A multi-layered processor-implemented method for secure access to corporate resources, comprising:
- receiving a Payload specific request to access a plurality of corporate resources from at least one user;
- initializing via a processor a uniquely identified Shell based on the received request;
- receiving a set of user authentication credentials from the user;
- sending the set of user authentication credentials to a corporate server controlling the corporate resources;
- receiving an authentication decision from the corporate server; and
- if the authentication decision is affirmative,
  - establishing a secure connection between the Shell and the corporate server,
  - receiving a plurality of control policies from the corporate server via the secure connection, wherein receiving the plurality of control policies comprises monitoring and downloading updates by the Shell from a Transfer Plane entity via an Out-of-Band channel, and
  - accessing the plurality of corporate resources via the established secure connection in compliance with the received control policies.

* * * * *

UNITED STATES PATENT AND TRADEMARK OFFICE
CERTIFICATE OF CORRECTION

PATENT NO. : 8,528,059 B1
APPLICATION NO. : 12/574673
DATED : September 3, 2013
INVENTOR(S) : Harpreet Singh Labana Page 1 of 1

It is certified that error appears in the above-identified patent and that said Letters Patent is hereby corrected as shown below:

In the Claims

Column 50, claim 31, line 22, delete "contra" and insert --control--

Signed and Sealed this
Nineteenth Day of August, 2014

Michelle K. Lee
*Deputy Director of the United States Patent and Trademark Office*